United States Patent
Huang et al.

(10) Patent No.: US 12,047,919 B2
(45) Date of Patent: Jul. 23, 2024

(54) WIRELESS COMMUNICATIONS METHOD AND APPARATUS

(71) Applicant: Huawei Technologies Co., Ltd., Shenzhen (CN)

(72) Inventors: Guogang Huang, Shenzhen (CN); Mao Yang, Xi'an (CN); Bo Li, Xi'an (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 17/451,104

(22) Filed: Oct. 15, 2021

(65) Prior Publication Data
US 2022/0039090 A1 Feb. 3, 2022

Related U.S. Application Data

(63) Continuation of application No. PCT/CN2020/084607, filed on Apr. 14, 2020.

(30) Foreign Application Priority Data

Apr. 17, 2019 (CN) .................. 201910310176.X

(51) Int. Cl.
*H04W 72/0446* (2023.01)
*H04W 72/0453* (2023.01)
*H04W 72/23* (2023.01)

(52) U.S. Cl.
CPC ... *H04W 72/0446* (2013.01); *H04W 72/0453* (2013.01); *H04W 72/23* (2023.01)

(58) Field of Classification Search
CPC ......... H04W 72/0446; H04W 72/0453; H04W 72/23; H04W 74/04; H04B 17/382
See application file for complete search history.

(56) References Cited

U.S. PATENT DOCUMENTS

| | | | | |
|---|---|---|---|---|
| 2008/0013514 A1* | 1/2008 | Lee | ................... | H04W 74/0808 370/338 |
| 2008/0069036 A1* | 3/2008 | Lee | ................... | H04W 74/0816 455/67.11 |

(Continued)

FOREIGN PATENT DOCUMENTS

| | | |
|---|---|---|
| CN | 107889257 A | 4/2018 |
| CN | 109478990 A | 3/2019 |
| CN | 109600854 A | 4/2019 |

OTHER PUBLICATIONS

IEEE P802.11ax™/D2.2, Feb. 2018, Draft Standard for Information technology-Telecommunications and information exchange between systems Local and metropolitan area networks-Specific requirements-Part 11: Wireless LAN Medium Access Control(MAC) and Physical Layer (PHY) Specifications, Amendment 6: Enhancements for High Efficiency WLAN, 620 pages.

(Continued)

*Primary Examiner* — Jung H Park
(74) *Attorney, Agent, or Firm* — Slater Matsil, LLP

(57) ABSTRACT

Embodiments of this application provide a wireless communications method and apparatus. The wireless communications method in this application includes: A first access point sends, over a common control channel, a first transmission allocation frame to a station, where the first transmission allocation frame is used to indicate the station to communicate with the first access point in a first time period over a first data channel; and the station communicates with the first access point in the first time period over the first data channel.

18 Claims, 13 Drawing Sheets

(56) References Cited

U.S. PATENT DOCUMENTS

| | | | |
|---|---|---|---|
| 2012/0014335 A1* | 1/2012 | Adachi | H04W 48/08 |
| | | | 370/329 |
| 2016/0128024 A1* | 5/2016 | Frederiks | H04W 72/04 |
| | | | 370/329 |
| 2018/0092039 A1 | 3/2018 | Cariou et al. | |
| 2018/0310342 A1* | 10/2018 | Patil | H04W 74/0825 |

OTHER PUBLICATIONS

IEEE Std 802.11-2016, IEEE Standard for Information technology-Telecommunications and information exchange between systems Local and metropolitan area networks-Specific requirements, Part 11: Wireless LAN Medium Access Control (MAC) and Physical Layer (PHY) Specifications, Approved Dec. 7, 2016, 3534 pages.

* cited by examiner

| Frame control (Frame control) | Duration (Duration) | Receiver address (Receiver Address, RA) | Transmitter address (Transmitter Address, TA) | Channel information (Channel information) | Time information (Time information) | Traffic limitation information (Traffic limitation information) | Frame sequence check (FCS) |

FIG. 5

| Frame control (Frame control) | Duration (Duration) | Receiver address (Receiver Address, RA) | Transmitter address (Transmitter Address, TA) | Traffic information (Traffic information) | Frame sequence check (FCS) |

| Control field for a TID bitmap (Control field for a TID bitmap) | Control field for a TS bitmap (Control field for a TS bitmap) | Buffer size for a TID n (Buffer size for a TID n) | ... | Buffer size for a TID m (Buffer size for a TID m) | Traffic specification for a TS i (TSPEC for a TS i) | ... | Traffic specification for a TS j (TSPEC for a TS j) |

FIG. 7B

| Frame control (Frame control) | Duration (Duration) | Receiver address (Receiver Address, RA) | Transmitter address (Transmitter Address, TA) | Quantity of allocations (Number of Allocations) | Channel allocation information 1 (Allocation 1) | ... | Channel allocation information n (Allocation n) | Frame sequence check (FCS) |

FIG. 9A

| Channel information (Channel information) | Time information (Time information) | Traffic limitation information (Traffic limitation information) | Quantity of STAs (Number of STAs) | AID list of STAs (AID list of STAs) |

FIG. 9B

| AID of a STA (AID of a STA) | Channel information (Channel information) | Time information (Time information) | Traffic limitation information (Traffic limitation information) |

FIG. 10

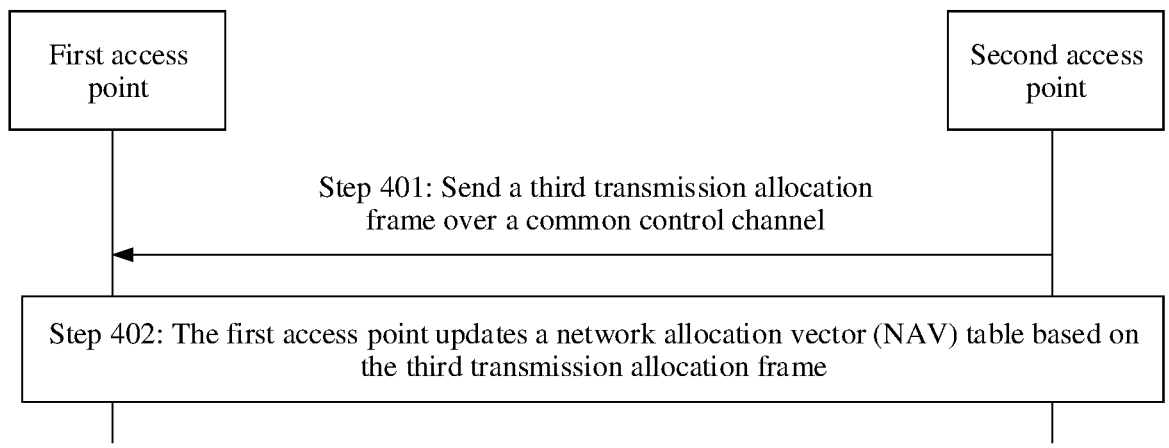

FIG. 11

WIRELESS COMMUNICATIONS METHOD AND APPARATUS

CROSS-REFERENCE TO RELATED APPLICATIONS

This application is a continuation of International Application No. PCT/CN2020/084607, filed on Apr. 14, 2020, which claims priority to Chinese Patent Application No. 201910310176.X, filed on Apr. 17, 2019. The disclosures of the aforementioned applications are hereby incorporated by reference in their entireties.

TECHNICAL FIELD

Embodiments of this application relate to wireless communications technologies, and in particular, to a wireless communications method and apparatus.

BACKGROUND

Currently, IEEE 802.11 is a universal standard, and is a communication standard defined by the international Institute of Electrical and Electronic Engineering (IEEE). IEEE 802.11 uses a carrier sense multiple access with collision avoidance (CSMA/CA) protocol to implement distributed channel access.

When the CSMA/CA is used, if a station senses that a channel is in a busy state, the station backs off for a period of random duration after the channel is idle again. Another station always backs off for a period of random duration after occupying the channel. This avoids an inter-station collision. However, as a quantity of stations increases, and access points (Access Points, AP) are deployed more intensively, the CSMA/CA mechanism still causes frequent collisions, leading to extremely severe performance degradation.

In addition, a band supported by a Wi-Fi standard is increasingly larger. However, there is always only one 20 MHz primary channel, and the primary channel is required for management, control, and data frame transmission. When the 20 MHz primary channel is occupied, a secondary channel cannot be used even if the secondary channel is idle. In a large-band transmission scenario, heavy dependence on the primary channel leads to low channel utilization.

SUMMARY

Embodiments of this application provide a wireless communications method and apparatus, to improve channel utilization.

According to a first aspect, an embodiment of this application provides a wireless communications method. The method may include: A station receives, over a common control channel, a first transmission allocation frame sent by a first access point, where the first transmission allocation frame is used to indicate the station to communicate with the first access point in a first time period over a first data channel; and the station communicates with the first access point in the first time period over the first data channel.

In some possible implementations, the first transmission allocation frame includes channel information and time information, the channel information is used to indicate the first data channel, and the time information is used to indicate the first time period.

In some possible implementations, the channel information includes an operating class, a band identifier (band ID), and a primary channel index.

In some possible implementations, the channel information may further include band information and at least one piece of channel center frequency information. The band information and the at least one piece of channel center frequency information are used to indicate a band and a center frequency that are of a data channel whose band is greater than 20 MHz.

In some possible implementations, the time information may include related information used to indicate a time period.

In some possible implementations, the first transmission allocation frame may further include a receiver address and a transmitter address.

In some possible implementations, the first transmission allocation frame further includes uplink and downlink indication information. The uplink and downlink indication information is used to indicate a transmission type of communication performed in the first time period over the first data channel. The transmission type includes downlink transmission, single-user uplink transmission, or multi-user uplink transmission.

In some possible implementations, the first transmission allocation frame further includes traffic limitation information. The traffic limitation information is used to indicate a traffic type of communication performed in the first time period over the first data channel.

In some possible implementations, the traffic type may include a background stream, common data, voice, or video.

In some possible implementations, the method further includes: The station switches to the common control channel if the station fails to access the first data channel within stay duration in the first time period or within the first time period.

In some possible implementations, the first transmission allocation frame further includes stay duration indication information. The stay duration indication information is used to indicate the stay duration.

In some possible implementations, the method further includes: The station sends a transmission requirement frame over the common control channel. The transmission requirement frame is used to report an uplink transmission requirement of the station.

In some possible implementations, the transmission requirement frame includes at least one of aperiodic traffic indication information and periodic traffic indication information, the aperiodic traffic indication information includes traffic type indication information and a size of to-be-transmitted data of at least one traffic type, the traffic type indication information is used to indicate the at least one traffic type, the periodic traffic information includes communications stream indication information and attribute information of at least one communications stream, and the communications stream indication information is used to indicate the at least one communications stream.

In some possible implementations, the common control channel includes a plurality of slots, each slot includes a first phase and a second phase, the first phase is used by the station to send the transmission requirement frame in the first phase, the second phase is used by the station to receive the first transmission allocation frame, and the first time period of the first transmission allocation frame is a time period in a next slot of a slot in which the second phase is located.

According to a second aspect, an embodiment of this application provides a wireless communications method. The method may include: A first access point sends, over a common control channel, a first transmission allocation frame to a first station, where the first transmission allocation frame is used to indicate the first station to communicate with the first access point in at least one first time period over at least one first data channel; and the first access point communicates with the first station in the at least one first time period over the at least one first data channel.

In some possible implementations, the method further includes: The first access point receives, over the common control channel, a transmission requirement frame sent by the first station, where the transmission requirement frame includes an uplink transmission requirement of the first station; and the first access point determines the first transmission allocation frame based on the transmission requirement frame sent by the first station.

In some possible implementations, that a first access point sends, over a common control channel, a first transmission allocation frame to a first station includes: The first access point sends the first transmission allocation frame to the first station in a send window over the common control channel. Duration of the send window is less than first preset duration T, and an end point of the send window is a start point of a farthest first time period in the at least one first time period; or duration of the send window is less than second preset duration L, an end point of the send window is an end point of an allocated time period, and the allocated time period is a time period, for performing communication, indicated by a second transmission allocation frame sent by the first access point before sending the first transmission allocation frame.

In some possible implementations, the common control channel includes a plurality of slots, each slot includes a first phase and a second phase, the first phase is used to receive a transmission requirement frame sent by the first station, the second phase is used to send the first transmission allocation frame to the first station, and the at least one first time period indicated by the first transmission allocation frame is included in a next slot of a slot in which the second phase is located.

In some possible implementations, the first transmission allocation frame includes at least one piece of channel information and at least one piece of time information. Each piece of channel information is used to indicate one first data channel. Each piece of time information is used to indicate one first time period.

In some possible implementations, the first transmission allocation frame further includes uplink and downlink indication information. The uplink and downlink indication information is used to indicate a transmission type of communication performed in the at least one first time period over the at least one first data channel. The transmission type includes downlink transmission, single-user uplink transmission, or multi-user uplink transmission.

In some possible implementations, the first transmission allocation frame further includes traffic limitation information. The traffic limitation information is used to indicate a traffic type used by the first station to communicate with the first access point in the at least one first time period over the at least one first data channel.

In some possible implementations, the transmission allocation frame further includes stay duration indication information. The stay duration indication information is used to indicate stay duration when the first station fails to access the at least one first data channel.

In some possible implementations, the method further includes: The first access point receives, over the common control channel, a third transmission allocation frame sent by a second access point, where the third transmission allocation frame is used to indicate a second station to communicate with the second access point in a second time period over a second data channel; and the first access point updates a network allocation vector NAV table based on the third transmission allocation frame, where updated NAV table includes channel information used to indicate the second data channel and time information used to indicate the second time period.

According to a third aspect, a wireless communications apparatus is provided. The apparatus may be a station, or may be a chip in a station. The apparatus has a function of implementing the station in the foregoing embodiments. The function may be implemented by hardware, or may be implemented by hardware executing corresponding software. The hardware or the software includes one or more units corresponding to the function.

In a possible design, when the apparatus is the station, the apparatus may include a processing module and a transceiver module. The processing module may be, for example, a processor. The transceiver module may be, for example, a transceiver, and the transceiver may include a radio frequency circuit and a baseband circuit.

Optionally, the apparatus may further include a storage unit, and the storage unit may be, for example, a memory. When the apparatus includes the storage unit, the storage unit is configured to store computer-executable instructions. The processing module is connected to the storage unit. The processing module executes the computer-executable instructions stored in the storage unit, to enable the apparatus to perform the wireless communications method related to the function of the station.

In another possible design, when the apparatus is the chip in the station, the chip includes a processing module and a transceiver module. The processing module may be, for example, a processor. The transceiver module may be, for example, an input/output interface, a pin, or a circuit on the chip. Optionally, the apparatus may further include a storage unit. The processing module may execute computer-executable instructions stored in the storage unit, to enable the chip in the station to perform the wireless communications method related to the function of the station in any one of the foregoing aspects.

Optionally, the storage unit may be a storage unit, for example, a register or a cache, in the chip. Alternatively, the storage unit may be a storage unit, for example, a read-only memory (ROM), another type of static storage device that can store static information and instructions, or a random access memory (RAM), that is in the station and that is located outside the chip.

The processor mentioned above may be a general-purpose central processing unit (CPU), a microprocessor, an application-specific integrated circuit (ASIC), or one or more integrated circuits configured to control program execution in the channel resource coordinated allocation method in the foregoing aspects.

According to a fourth aspect, this application provides a wireless communications apparatus. The apparatus may be an access point, or may be a chip in an access point. The apparatus has a function of implementing the embodiments related to the access point in the foregoing aspects. The function may be implemented by hardware, or may be implemented by hardware executing corresponding software. The hardware or the software includes one or more units corresponding to the function.

In a possible design, when the apparatus is the access point, the apparatus may include a processing module and a transceiver module. The processing module may be, for example, a processor. The transceiver module may be, for example, a transceiver. The transceiver includes a radio frequency circuit. Optionally, the apparatus further includes a storage unit, and the storage unit may be, for example, a memory. When the apparatus includes the storage unit, the storage unit is configured to store computer-executable instructions. The processing module is connected to the storage unit. The processing module executes the computer-executable instructions stored in the storage unit, to enable the apparatus to perform the wireless communications method related to the function of the access point in any one of the foregoing aspects.

In another possible design, when the apparatus is the chip in the access point, the chip includes a processing module and a transceiver module. The processing module may be, for example, a processor. The transceiver module may be, for example, an input/output interface, a pin, or a circuit on the chip. The processing module may execute computer-executable instructions stored in a storage unit, to enable the chip in the access point to perform the wireless communications method related to the function of the access point in the foregoing aspects. Optionally, the storage unit is a storage unit, for example, a register or a cache, in the chip. The storage unit may alternatively be a storage unit, for example, a ROM or another type of static storage device that can store static information and instructions, or a RAM, that is in the access point and that is located outside the chip.

The processor mentioned above may be a CPU, a microprocessor, an ASIC, or one or more integrated circuits for controlling program execution of the foregoing wireless communications method.

According to a fifth aspect, a computer storage medium is provided. The computer storage medium stores program code, and the program code is used to indicate instructions of performing the method according to any one of the first aspect to the second aspect or the possible implementations thereof.

According to a sixth aspect, a processor is provided. The processor is coupled to a memory, and is configured to perform the method according to any one of the first aspect to the second aspect or the possible implementations thereof.

According to a seventh aspect, a computer program product including instructions is provided. When the computer program product is run on a computer, the computer is enabled to perform the method according to any one of the first aspect to the second aspect or the possible implementations thereof.

According to an eighth aspect, a communications system is provided. The system includes the station according to any possible implementation of the first aspect and the access point according to any possible implementation of the second aspect.

According to the wireless communications method and apparatus in the embodiments of this application, the first access point sends, over the common control channel, the first transmission allocation frame to the station. The first transmission allocation frame is used to indicate the station to communicate with the first access point in the first time period over the first data channel. The station communicates with the first access point in the first time period over the first data channel, and sends the first transmission allocation frame over the common control channel, to indicate a data channel over which the station communicates with the first access point, and a time period. In this way, control and data transmission are separated on different channels. This reduces heavy dependence on a primary channel, and can improve channel utilization.

BRIEF DESCRIPTION OF THE DRAWINGS

FIG. 5 is a schematic diagram of a transmission allocation frame according to an embodiment of this application;

FIG. 7B is a schematic diagram of a traffic information field in the transmission requirement frame shown in FIG. 7A according to an embodiment of this application;

FIG. 9A is a schematic diagram of another transmission allocation frame according to an embodiment of this application;

FIG. 9B is a schematic diagram of a channel allocation information field in the transmission allocation frame shown in FIG. 9A according to an embodiment of this application;

FIG. 10 is a schematic diagram of a channel allocation information field in the transmission allocation frame shown in FIG. 9A according to an embodiment of this application;

FIG. 11 is a flowchart of another wireless communications method according to an embodiment of this application;

DETAILED DESCRIPTION OF ILLUSTRATIVE EMBODIMENTS

Figure 1:
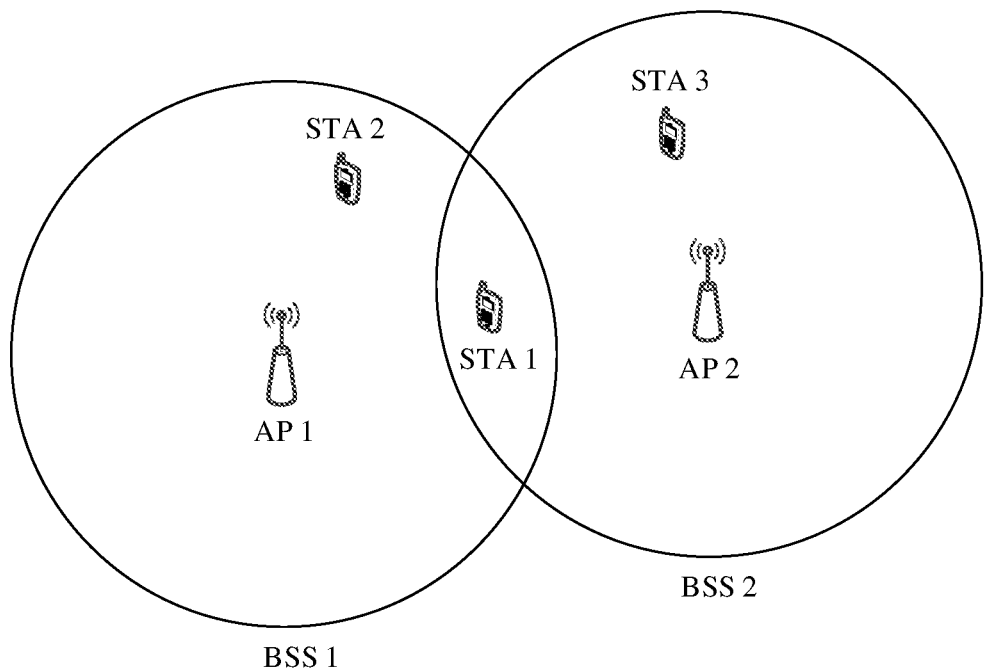
FIG. 1 is a schematic diagram of an application scenario according to an embodiment of this application.

In the embodiments of this application, "first", "second", and the like (if any) are intended to distinguish between similar objects but do not necessarily indicate a specific order or sequence.

An access point (AP) provides a wireless access function for a station according to the 802.11 protocol, and is a bridge between a wireless network and a wired network. The access point may also be referred to as a "hotspot".

The access point in this application has a multi-band and multi-radio capability. The access point has a plurality of sets of independent 802.11-compliant chips. To be specific, each set of 802.11-compliant chips may include an independent baseband processing module and a radio frequency module, to support a multi-radio capability. Different radio frequency modules may operate on different channels on a same band, or may operate on different bands. One radio frequency module of the access point may always operate on an open control channel, and another radio frequency module may switch between different channels on different bands or on a same band.

A first access point, a second access point, a third access point, and the like, and first, second, third, and the like in this application are used to distinguish between different access points. An access point using the wireless communications method in this application may be the foregoing access point having the multi-band and multi-radio capability.

A station (STA) is a communications apparatus, for example, a terminal device supporting the 802.11 protocol, that has a wireless communications function, and may access the internet by using an access point (AP). The terminal device may be a personal computer (PC), a mobile terminal, or the like. The mobile terminal may also be referred to as user equipment (UE), an access terminal, a subscriber unit, a subscriber station, a mobile station, a user terminal, a terminal, a wireless communications device, a user agent, or a user apparatus. The mobile terminal may be a smartphone, a cellular phone, a cordless phone, a tablet computer, a personal digital assistant (PDA) device, a handheld device having a wireless communications function, another processing device connected to a wireless modem, a vehicle-mounted device, a wearable device, or the like.

The station in this application may have a multi-band and single-radio capability, or may have a multi-band and multi-radio capability.

A first station, a second station, a third station, and the like, and first, second, third, and the like in this application are used to distinguish between different stations. A station using the wireless communications method in this application may be the foregoing station having the multi-band and single-radio capability, or may be the foregoing station having the multi-band and multi-radio capability.

One AP and one or more stations may form a basic service set (BSS). Basic service set (BSS) is a minimum element of a wireless local area network as specified in the 802.11 protocol standard.

The wireless communications method in this application is applicable to a WLAN scenario including one BSS, and may be further applied to a WLAN scenario including a plurality of BSSs. Each BSS has one AP and at least one STA. Some or all APs can directly communicate with each other.

Different from a mode, described in the background part, in which a primary channel is used for both control and data frame transmission, a channel is divided into a common control channel and at least one data channel in this application. The common control channel is used to transmit control information, and the data channel is used to transmit a data frame. The common control channel and the at least one data channel may be on one band, or may be on different bands. A specific location of the common control channel may be preset, or may be dynamically allocated.

For example, FIG. 1 is a schematic diagram of an application scenario according to an embodiment of this application. As shown in FIG. 1, the application scenario is described by using two BSSs as an example. A BSS 1 includes an AP 1, a STA 1, and a STA 2, and a BSS 2 includes an AP 2 and a STA 3. In an example, the BSS 1 and the BSS 2 may share one common control channel and at least one data channel. Any one or more of the STA 1, the STA 2, or the STA 3 may receive, over the common control channel, a transmission allocation frame sent by the AP 1 or the AP 2, to communicate with the AP 1 or the AP 2 in a corresponding time period over a corresponding data channel.

For a specific implementation of the wireless communications method in this application, refer to description of the following embodiments.

It should be noted that the wireless communications method in this application may be applied not only between APs and between STAs, but also between APs and STAs. Communication between an AP and a STA is used as an example in the embodiments of this application. This constitutes no limitation.

It should be further noted that a "time period" in this application specifically refers to a time period determined by a start time and an end time on a time axis. A location, on the time axis, of the time period may be determined based on the start time and duration, the end time and duration, or the start time and the end time.

Figure 2:
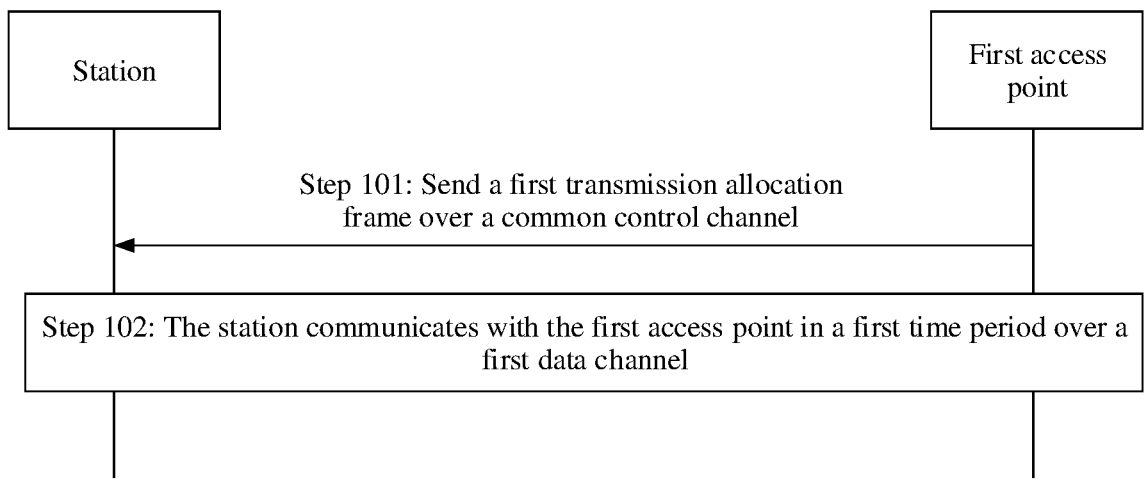
FIG. 2 is a flowchart of a wireless communications method according to an embodiment of this application.

FIG. 2 is a flowchart of a wireless communications method according to an embodiment of this application. As shown in FIG. 2, this embodiment relates to a first access point and a station. For example, the first access point may be the AP 1 shown in FIG. 1, and the station may be the STA 1 shown in FIG. 1. The method in this embodiment may include the following steps.

Step 101: The first access point sends a first transmission allocation frame to the station over a common control channel.

The station receives, over the common control channel, the first transmission allocation frame sent by the first access point.

The first transmission allocation frame is used to indicate the station to communicate with the first access point in a first time period over a first data channel. The first time period may include one or more time units, and may be specifically flexibly set based on a requirement.

That the station communicates with the first access point in the first time period over the first data channel may include: The station performs downlink data transmission with the first access point in the first time period over the first data channel, or the station performs uplink data transmission with the first access point in the first time period over the first data channel.

The first access point may determine, based on a transmission requirement of the first access point, a location and a length, on a time axis, of the first data channel and/or the first time period, or may determine, based on a transmission requirement of the first station, the location and the length, on the time axis, of the first data channel and/or the first time period. Certainly, it may be understood that the first access point may further determine, based on other information, the location and the length, on the time axis, of the first data channel and/or the first time period, to generate the first transmission allocation frame.

In an example, for downlink transmission, the first access point may determine, based on to-be-transmitted data, the location and the length, on the time axis, of the first data channel and/or the first time period. For example, the first access point may determine, based on information such as a size of the to-be-transmitted data and a transmission priority, the location and the length, on the time axis, of the first data channel and/or the first time period. In some embodiments, the first access point may further comprehensively determine, based on channel quality of each data channel, the location and the length, on the time axis, of the first data channel and/or the first time period.

In an example, for uplink transmission, the first station may send the transmission requirement to the first access point, and the first access point may determine, based on the transmission requirement sent by the first station, the location and the length, on the time axis, of the first data channel and/or the first time period. For example, the transmission requirement may include information such as the size of to-be-transmitted data and the transmission priority. In some embodiments, the first access point may further comprehensively determine, based on channel quality of each data channel, the location and the length, on the time axis, of the first data channel and/or the first time period.

For example, the first access point may add, to a beacon (Beacon), an element (element) for switching to the common control channel. The element is used to enable the station to switch to the common control channel, to receive the first transmission allocation frame sent by the first access point.

Step 102: The station communicates with the first access point in the first time period over the first data channel.

The station switches to the first data channel indicated by the first transmission allocation frame in the first time period, to communicate with the first access point. The communication may include uplink transmission or downlink transmission.

For downlink transmission, optionally the station receives, in the first time period over the first data channel, data sent by the first access point.

For uplink transmission, optionally the station sends data to the first access point in the first time period over the first data channel.

In this embodiment, the first access point sends, over the common control channel, the first transmission allocation frame to the station. The first transmission allocation frame is used to indicate the station to communicate with the first access point in the first time period over the first data channel. The station communicates with the first access point in the first time period over the first data channel, and sends the first transmission allocation frame over the common control channel, to indicate a data channel over which the station communicates with the first access point, and a time period. In this way, control and data transmission are separated on different channels. This reduces heavy dependence on a primary channel, and can improve channel utilization.

Figure 3:
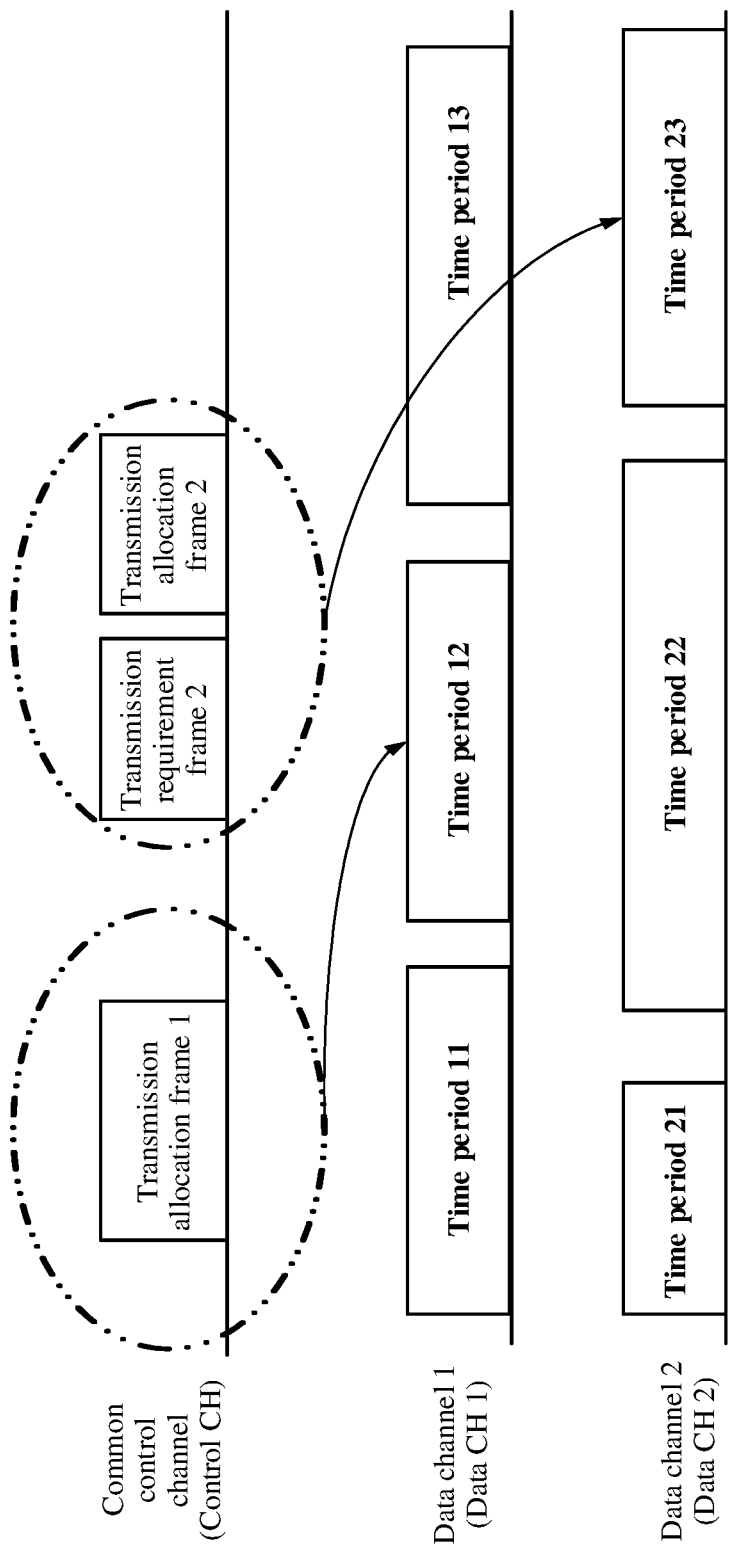
FIG. 3 is a schematic diagram of a common control channel and data channels according to an embodiment of this application.

A specific example is used to describe the embodiment shown in FIG. 2. FIG. 3 is a schematic diagram of a common control channel and data channels according to an embodiment of this application. As shown in FIG. 3, for example, one common control channel and two data channels are different channels. An AP sends a transmission allocation frame 1 over the common control channel (Control CH). The transmission allocation frame 1 is used to indicate a STA to communicate with the AP in a communications time period 12 over a data channel 1 (Data CH 1). The AP sends a transmission allocation frame 2 over the common control channel (Control CH). The transmission allocation frame 2 is used to indicate the STA to communicate with the AP in a communications time period 23 of over data channel 2 (Data CH 2).

During uplink transmission, the STA may further send a transmission requirement frame to the AP over the common control channel (Control CH), to request to communicate with the AP. For example, as shown in FIG. 3, before the AP sends the transmission allocation frame 2 to the STA, the STA sends a transmission requirement frame 2 to the AP over the common control channel (Control CH).

It can be learned that the common control channel in this application may be used to send a transmission allocation frame and/or a transmission requirement frame. The data channel may be used to perform data transmission in a corresponding time period according to an indication of the transmission allocation frame.

In an implementation, the first transmission allocation frame may include channel information and time information. The channel information is used to indicate the foregoing first data channel. The time information is used to indicate the foregoing first time period.

The channel information may include related information used to indicate an allocated data channel, for example, may include at least one of an operating class, a band identifier (band ID), or a primary channel index. The operating class is used to distinguish spectrum regulation in different countries or regions. The band identifier (band ID) may indicate an operating band of 2.4 GHz, 5 GHz, or 6 GHz. For details about the operating band indicated by the band identifier (band ID), refer to Table 1. The primary channel index may indicate a specific 20 MHz channel, for example, may indicate the data channel 1 (Data CH 1) shown in FIG. 3.

TABLE 1

Band identifier (band ID) reference table

| Band identifier (Band ID) | Operating band |
|---|---|
| 0 | TV white spaces (TV white spaces) |
| 1 | Sub-1 GHz bands excluding TV white spaces (Sub-1 GHz bands (excluding TV white spaces)) |
| 2 | 2.4 GHz |
| 3 | 3.6 GHz |
| 4 | 4.9 GHz and 5 GHz |
| 5 | 60 GHz |
| 6-255 | Reserved (Reserved) |

Figure 4:
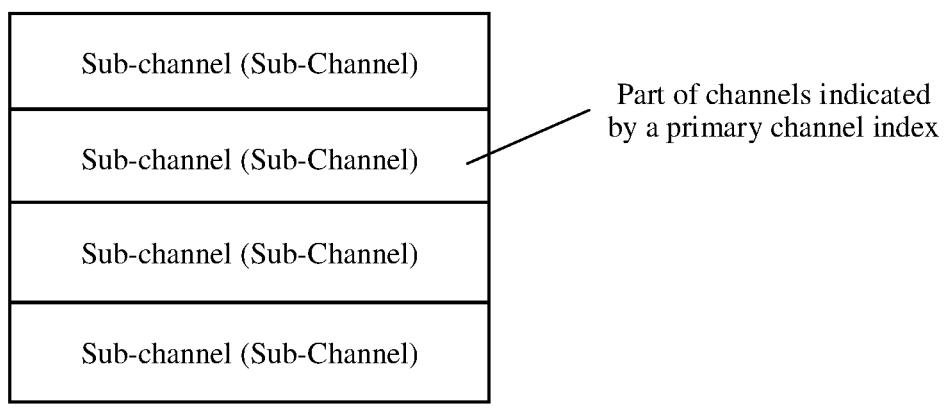
FIG. 4 is a schematic diagram of a data channel according to an embodiment of this application.

In another implementation, in addition to the operating class, the band identifier (band ID), and the primary channel index, the channel information may further include band information and at least one piece of channel center frequency information. The band information and the at least one piece of channel center frequency information are used to indicate a band and a center frequency that are of a data channel whose band is greater than 20 MHz. The 20 MHz channel indicated by the primary channel index (Primary channel index) is a part of the data channel whose band is greater than 20 MHz. Refer to FIG. 4. An 80 MHz data channel may be divided into four sub-channels, and a sub-channel indicated by the primary channel index is one of the sub-channels of the data channel.

The band information may include a plurality of bits that are used to indicate a band of a data channel respectively. For example, if the indicated band is 0, it indicates that the band of the data channel is 20 MHz; if the indicated band is 1, it indicates that the band of the data channel is 40 MHz; and if the indicated band is 2, it indicates that the band of the data channel is 80 MHz. The at least one piece of channel center frequency information is used to indicate the center frequency of the data channel whose band is greater than 20 MHz. For example, one piece of channel center frequency information is used to indicate a center frequency of a data channel with contiguous spectrums. Two pieces of channel center frequency information are used to indicate center frequencies of a data channel with non-contiguous spectrums. For example, when two channel center frequencies include a and b, and an indicated band is 2, it indicates that the data channel includes two 40 MHz channels with non-contiguous spectrums, where one center frequency is a, and the other center frequency is b.

The time information may include related information used to indicate a time period, for example, may include a start time and duration. Alternatively, the time information may include an end time and duration. Alternatively, the time information may include a start time and an end time.

It should be noted that, in an implementation, the channel information and the time information may be used to indicate the station to communicate with the first access point in one time period over one data channel. In another implementation, the channel information and the time information may be used to indicate the station to communicate with the first access point in a plurality of time periods over a plurality of data channels. In still another implementation, the channel information and the time information may be used to indicate the station to communicate with the first access point in a plurality of time periods over one data channel.

In some embodiments, the first transmission allocation frame may further include uplink and downlink indication information. The uplink and downlink indication information is used to indicate a transmission type of communication performed in the first time period over the first data channel. The transmission type includes downlink transmission, single-user uplink transmission, or multi-user uplink transmission.

For example, the uplink and downlink indication information of the first transmission allocation frame is used to indicate that the transmission type of communication performed in the first time period over the first data channel is the downlink transmission, and the station receives, based on the first transmission allocation frame, the data sent by the first access point in the first time period over the first data channel.

The uplink and downlink indication information of the first transmission allocation frame is used to indicate that the transmission type of communication performed in the first time period over the first data channel is single-user uplink transmission. The station sends the data to the first access point in the first time period over the first data channel based on the first transmission allocation frame.

The uplink and downlink indication information of the first transmission allocation frame is used to indicate that the transmission type of communication performed in the first time period over the first data channel is multi-user uplink transmission. After the station receives, in the first time period over the first data channel, a trigger frame sent by the first access point, the station sends uplink data to the first access point. The trigger frame is used to trigger a plurality of stations to perform uplink transmission.

In some embodiments, the first transmission allocation frame further includes traffic limitation information. The traffic limitation information is used to indicate a traffic type of communication performed in the first time period over the first data channel.

The traffic type may include a background stream, common data, voice, or video. An access category (AC) or a traffic identifier (TID) may be used to indicate transmission requirements of different traffic types. The AC has four priorities: an AC 0, an AC 1, an AC 2, and an AC 3.

For example, the traffic limitation information may include the AC 0, to indicate that a traffic type allowed by the first station to perform communication in the first time period over the first data channel is the AC 0. For uplink transmission, the station sends, in the first time period over the first data channel based on the traffic limitation information, data belonging to the AC 0 to the first access point.

The information carried in the transmission allocation frame may be carried in a corresponding field in the transmission allocation frame.

FIG. 5 is a schematic diagram of a transmission allocation frame according to an embodiment of this application. As shown in FIG. 5, the transmission allocation frame may include a frame control field, a duration field, a receiver address (RA) field, a transmitter address (TA) field, a channel information field, a time information field, a traffic limitation information field, and a frame sequence check (FCS) field.

The channel information field may carry the foregoing channel information, the time information field may carry the foregoing time information, and the traffic limitation information field may carry the foregoing traffic limitation information. For specific explanation and description thereof, refer to the foregoing embodiment. Details are not described herein again.

It should be noted that, one channel information field in the transmission allocation frame shown in FIG. 5 may be used to indicate one data channel and one time information field indicates one time period.

The duration field is used to indicate duration occupied by the transmission allocation frame. The receiver address (RA) field may include an address of a target receiving node, for example, a MAC address of the target receiving node. The embodiment shown in FIG. 2 is used as an example. An RA field in the first transmission allocation frame may include a MAC address of the station. The transmitter address (TA) field may include an address of a transmit node, for example, a MAC address of the transmit node. The embodiment shown in FIG. 2 is used as an example. A TA field in the first transmission allocation frame may include a MAC address of the first access point. The frame sequence check (FCS) field is used by a receiver to determine whether the transmission allocation frame is correctly received.

Optionally, after correctly receiving the transmission allocation frame, the station may send an acknowledgment (ACK) to the first access point.

In this embodiment, the transmission allocation frame is set to carry information such as the channel information, the time information, and the traffic limitation information, so that the station receiving the transmission allocation frame over the common control channel determines to perform communication of data of a corresponding traffic type with the first access point in the first time period over the first data channel. Therefore, this meets communications requirements of data of different traffic types.

It should be noted that the field information of the transmission allocation frame is used as an example for description, and a sequence of the field information is not limited thereto. The transmission allocation frame may further include other field information, which may be flexibly set based on a requirement. In addition, FIG. 5 is described only by using an example in which the transmission allocation frame includes one channel information field and one time information field. It may be understood that the transmission allocation frame may further include a plurality of channel information fields and a plurality of time information fields that are in a one-to-one correspondence with the plurality of channel information fields. For example, the transmission allocation frame may include a channel information field 1 and a time information field 1, a channel information field 2 and a time information field 2, . . . , and a channel information field n and a time information field n. The channel information fields 1 to n are in a one-to-one correspondence with the time information fields 1 to n.

The transmission allocation frame may further include one channel information field and time information fields corresponding to the one channel information field. For example, the transmission allocation frame may include a channel information field 1, a time information field 1, a time information field 2, . . . , and a time information field n.

In some embodiments, the wireless communications method in this application may further include the following step: The station switches to the common control channel if the station fails to access the first data channel within stay duration in the first time period or within the first time period.

In an implementation, the station switches to the common control channel if the station fails to access the first data channel within the stay duration in the first time period. The stay duration is less than or equal to duration of the first time period. A start time of the stay duration may be a start time of the first time period, or may be a time after the start time of the first time period. The stay duration may be preset, or may be indicated by the first access point. When the stay duration is indicated by the first access point, the first transmission allocation frame may further include stay duration indication information. The stay duration indication information is used to indicate the stay duration. Similar to the foregoing time information, the stay duration may include a start time and duration.

In another implementation, the station switches to the common control channel if the station fails to access the first data channel within the first time period. To be specific, in this implementation, the first access point does not need to indicate the stay duration to the first station. Alternatively, the stay duration indicated by the first access point is equal to the first duration.

That the station fails to access the first data channel in the foregoing two implementations may include that the first data channel is not obtained through contention, or the data sent by the first access point is not received.

In this embodiment, the station switches to the common control channel if the station fails to access the first data channel within the stay duration in the first time period or within the first time period. Therefore, when the communication fails, the station promptly switches to the common control channel, to improve reliability of the communication between the access point and the station. This can avoid a large transmission delay because the station fails in communication and waits for a long time.

Figures 6, 7A:
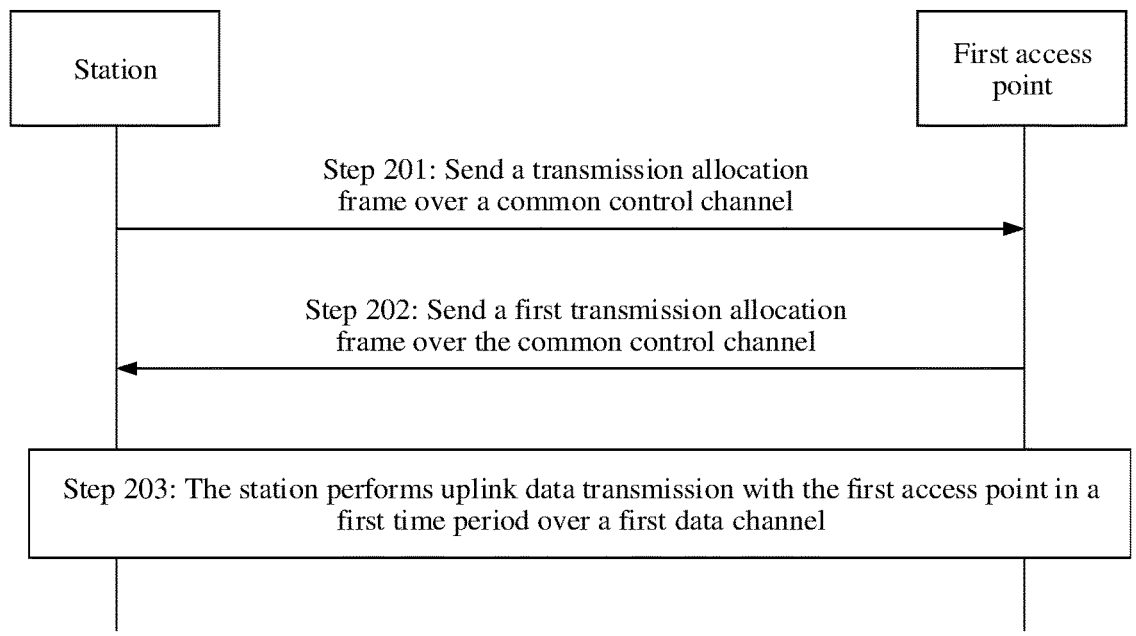
FIG. 6 is a flowchart of another wireless communications method according to an embodiment of this application.
FIG. 7A is a schematic diagram of a transmission requirement frame according to an embodiment of this application.

FIG. 6 is a flowchart of another wireless communications method according to an embodiment of this application. As shown in FIG. 6, an application scenario of this embodiment is uplink transmission, and the method in this embodiment may include the following steps:

Step 201: A station sends a transmission requirement frame to a first access point over a common control channel.

The first access point receives, over the common control channel, the transmission requirement frame sent by the station.

The transmission requirement frame is used to report an uplink transmission requirement of the station. For example, the uplink transmission requirement may include information such as a size of to-be-transmitted data and a transmission priority.

The first access point may determine, based on the transmission requirement frame, a data channel that is used to communicate with the station and a time period.

Step 202: The first access point sends a first transmission allocation frame to the station over the common control channel.

The station receives, over the common control channel, the first transmission allocation frame sent by the first access point.

Step 203: The station performs uplink data transmission with the first access point in a first time period over a first data channel.

For specific explanation and description of step 202 and step 203, refer to the description of step 101 and step 202 in the embodiment shown in FIG. 2, and details are not described herein again.

In some embodiments, an implementation of step 202 is as follows: After receiving the transmission requirement frame, the first access point sends the first transmission allocation frame to the station over the common control channel.

In another implementation of step 202, after receiving the transmission requirement frame, the first access point sends an acknowledgment (ACK) to the first station, and sends the first transmission allocation frame to the station over the common control channel after a preset time.

Optionally, after correctly receiving the first transmission allocation frame, the station may further send the acknowledgment (ACK) to the first access point.

This embodiment of this application describes an uplink transmission scenario. In a downlink application scenario, optionally, before step 202, the first access point determines a transmission requirement, for example, determines the transmission requirement based on a size or a priority of data that needs to be sent by the first access point to the station. In step 203, the first access point sends downlink data to the station in a first time period over a first data channel.

In this embodiment, the station sends the transmission requirement frame to the first access point over the common control channel. The first access point sends the first transmission allocation frame to the station over the common control channel. The station communicates with the first access point in the first time period over the first data channel. In this way, the first access point properly allocates, based on a transmission requirement of the station, a data channel over which the station communicates with the first access point, and a time period. This improves data transmission efficiency and channel utilization.

In an implementation, for description of the transmission requirement frame, the transmission requirement frame may include traffic information (Traffic information), and the traffic information is used to indicate information about to-be-transmitted traffic data.

In an implementation, the traffic information may include at least one of aperiodic traffic indication information and periodic traffic indication information. The aperiodic traffic indication information is used to indicate that data of at least one traffic type needs to be sent. The periodic traffic indication information is used to indicate that at least one communications stream needs to be sent.

The aperiodic traffic indication information may include traffic type indication information and a size of the to-be-transmitted data of the at least one traffic type, and the traffic type indication information is used to indicate the at least one traffic type. The periodic traffic information may include communications stream indication information and attribute information of the at least one communications stream. The communications stream indication information is used to indicate the at least one communications stream.

The traffic type indication information may also be referred to as a TID control field for a TID bitmap (Control field for a TID bitmap). The traffic type indication information may be a binary bitmap. Each bit in the bitmap is corresponding to one TID. A bit 1 is used to indicate that there is a data transmission requirement of a corresponding TID, and a bit 0 is used to indicate that there is no data transmission requirement of a corresponding TID. The size of the to-be-transmitted data of the at least one traffic type includes a size of to-be-transmitted data of at least one TID, and the at least one TID is the TID corresponding to the bit 1 in the binary bitmap. For example, the size of the to-be-transmitted data of the at least one traffic type includes a buffer size for a TID n (Buffer size for a TID n) and a buffer size for a TID m (Buffer size for a TID m), where n and m are positive integers. The buffer size for the TID n (Buffer size for the TID n) is used to indicate a buffer size for a TID corresponding to an $n^{th}$ bit, and the buffer size for the TID m (Buffer size for the TID m) is used to indicate a buffer size for a TID corresponding to an $m^{th}$ bit. Specific values of n and m are related to the foregoing binary bitmap. For example, if the traffic type indication information is 10001000, the size of the to-be-transmitted data of the at least one traffic type includes a buffer size for a TID 1 and a buffer size for a TID 5.

The communications stream indication information may also be referred to as a TS control field for a TS bitmap (Control field for a TS bitmap). The communications stream indication information may be a binary bitmap. Each bit in the bitmap is corresponding to one traffic stream (Traffic stream, TS). A bit 1 is used to indicate that there is a transmission requirement of a corresponding TS, and a bit 0 is used to indicate that there is no transmission requirement of a corresponding TS. The attribute information of the at least one communications stream includes a traffic specification (Traffic specification, TSPEC) for at least one TS, and the at least one TS is the TS corresponding to the bit 1 in the binary bitmap. For example, the attribute information of the at least one communications stream includes a traffic specification for a TS i (TSPEC for a TS i), . . . , and a traffic specification for a TS j (TSPEC for a TS j), where i and j are positive integers. The traffic specification for the TS i is used to indicate a traffic specification for a TS corresponding to an PI bit, and the traffic specification for the TS j is used to indicate a traffic specification for a TS corresponding to a $j^{th}$ bit. The traffic specification may include information such as a service interval time, a minimum rate, a packet size, a maximum delay, and the like. For example, if the communications stream indication information is 10100, the attribute information of the at least one communications stream includes a traffic specification for a TS 1 and a traffic specification for a TS 3.

The information carried in the transmission requirement frame may be carried in a corresponding field in the transmission requirement frame.

FIG. 7A is a schematic diagram of a transmission requirement frame according to an embodiment of this application. As shown in FIG. 7A, the transmission requirement frame may include a frame control field, a duration field, and a receiver address (RA) field, a transmitter address (TA) field, a traffic information field, and a frame sequence check (FCS) field.

The traffic information field is used to carry the foregoing traffic information. For specific explanation and description thereof, refer to the foregoing embodiment. Details are not described herein again. The duration field is used to indicate duration occupied by the transmission requirement frame. The receiver address (RA) field may include an address of a target receiving node, for example, a MAC address of the target receiving node. The embodiment shown in FIG. 6 is used as an example. The RA field in the transmission requirement frame may include a MAC address of a first access point. The transmitter address (TA) field may include an address of a transmit node, for example, a MAC address of the transmit node. The embodiment shown in FIG. 6 is used as an example. The TA field in the transmission requirement frame may include a MAC address of a first station. The frame sequence check (FCS) field is used by a receiver to determine whether the transmission requirement frame is correctly received.

FIG. 7B is a schematic diagram of a traffic information field in the transmission requirement frame shown in FIG. 7A according to an embodiment of this application. As shown in FIG. 7B, the traffic information field may include a control subfield for a TID bitmap, a control subfield for a TS bitmap, a buffer size for a TID n subfield, . . . , a buffer size for a TID m subfield, a traffic specification for a TS i (TSPEC for a TS i) subfield, . . . , and a traffic specification for a TS j (TSPEC for a TS j) subfield.

For specific explanation and description of corresponding information carried in the control subfield for a TID bitmap, the control subfield for a TS bitmap, the buffer size for a TID n subfield, . . . , the buffer size for a TID m subfield, the traffic specification for a TS i (TSPEC for a TS i) subfield, . . . , and the traffic specification for a TS j (TSPEC for a TS j) subfield, refer to the foregoing embodiment. Details are not described herein again.

In this embodiment, the transmission requirement frame is set to carry the traffic information, so that a first access point receiving the transmission requirement frame over a common control channel learns a data transmission requirement of a station, and further determines, based on the data transmission requirement, to perform communication of corresponding data with the station in a first time period over a first data channel. Therefore, this meets an uplink data transmission requirement of the station.

It should be noted that the field information of the transmission requirement frame is used as an example for description, and a sequence of the field information is not limited thereto. The transmission requirement frame may further include other field information, which may be flexibly set based on a requirement.

The first transmission allocation frame in the foregoing embodiment is used to indicate one station to communicate with the first access point in the first time period over the first data channel. In this embodiment of this application, the first transmission allocation frame is used to allocate first time periods, for a plurality of first data channels, to a plurality of stations. In this way, the plurality of stations can communicate with the first access point over the plurality of first data channels. For a specific implementation thereof, refer to explanation and description in the following embodiment.

Figure 8:
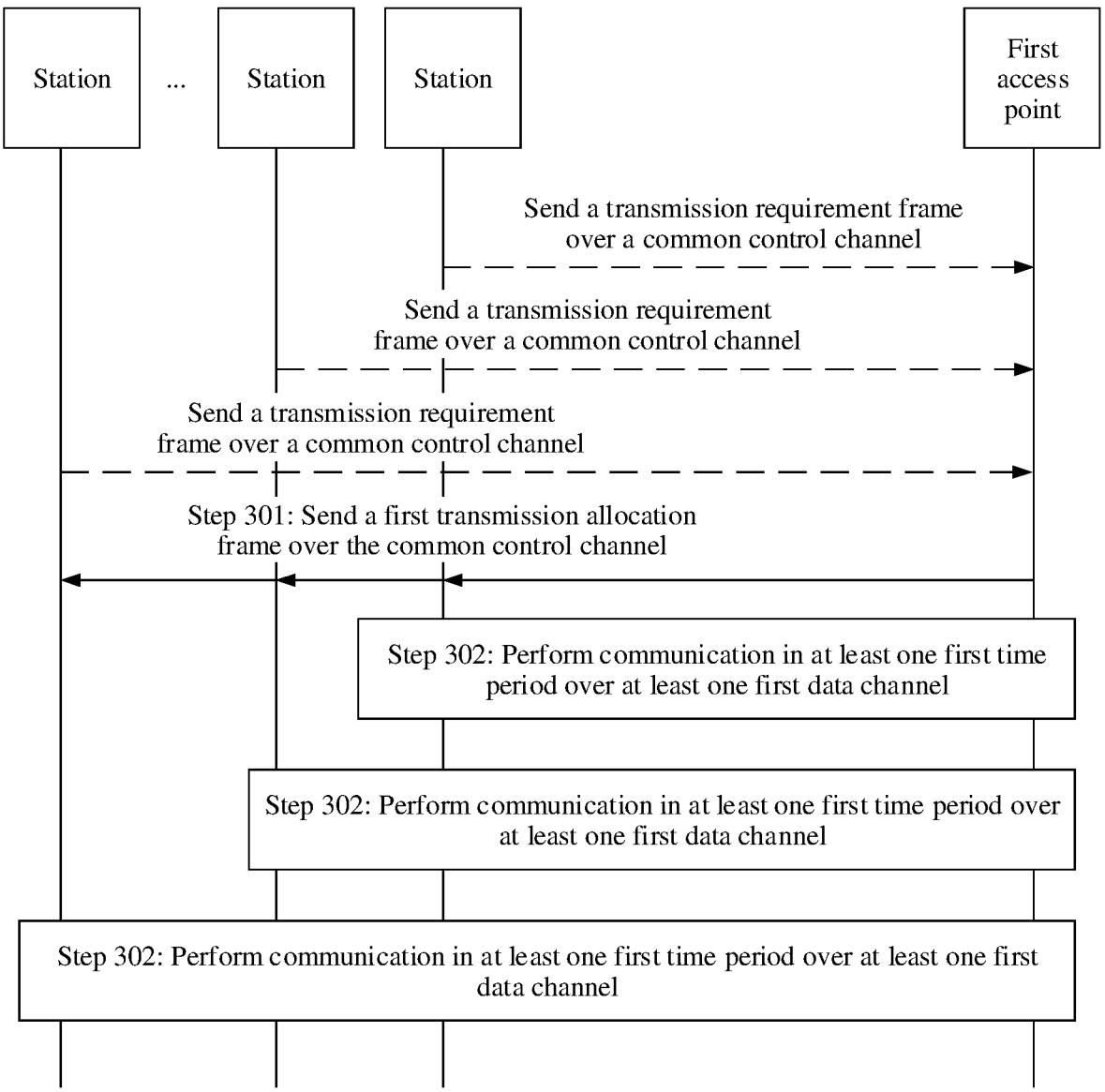
FIG. 8 is a flowchart of another wireless communications method according to an embodiment of this application.

FIG. 8 is a flowchart of another wireless communications method according to an embodiment of this application. As shown in FIG. 8, this embodiment relates to a first access point and a plurality of stations, and a quantity of the plurality of stations may be two, three, or more. For example, the first access point may be the AP 1 shown in FIG. 1, and the plurality of stations may be the STA 1 and the STA 2 shown in FIG. 1. The method in this embodiment may include the following steps.

Step 301: The first access point sends a first transmission allocation frame to the plurality of stations over the common control channel.

The plurality of stations receive, over the common control channel, the first transmission allocation frame sent by the first access point.

The first transmission allocation frame is used to indicate the plurality of stations to communicate with the first access point in at least one first time period over at least one first data channel.

The first access point may allocate, to the plurality of stations by using the first transmission allocation frame, a data channel over which the first access point communicates with the plurality of stations, and a time period for the data channel.

The at least one first data channel is explained and described. When a quantity of the at least one first data channel is two or more, namely, at least two first data channels, any two of the at least two first data channels may be the same or may be different.

The at least one first time period is explained and described. When a quantity of the at least one first time period is two or more, namely, at least two first time periods, any two of the at least two first time periods may be the same or may be different.

For example, the AP 1 sends the first transmission allocation frame to the STA 1 and the STA 2 over the common control channel shown in FIG. 3. The first transmission allocation frame may be used to indicate the STA 1 to communicate with the AP 1 in the communications time period 12 over the data channel 1 (Data CH 1), and indicate the STA 2 to communicate with the AP 1 in a communications time period 22 over the data channel 2 (Data CH 2). The communication may include uplink communication or downlink communication.

The first access point may determine, based on a transmission requirement of the first access point, a location and a length, on a time axis, of the at least one first data channel and/or the at least one first time period, or may determine, based on a transmission requirement of each station, the location and the length, on the time axis, of the at least one first data channel and/or the at least one first time period. Certainly, it may be understood that the first access point may further determine, based on other information, the location and the length, on the time axis, of the at least one first data channel and/or the at least one first time period, to generate the first transmission allocation frame.

For downlink transmission, the first access point may determine the first transmission allocation frame based on to-be-transmitted data and a target receiver. For example, the first access point may determine, based on information such as a size of the to-be-transmitted data, a transmission priority, and the target receiver, the location and the length, on the time axis, of the at least one first data channel and/or the at least one first time period. For example, two first data channels (the data channel 1 and the data channel 2) and two first time periods (the communications time period 12 and the communications time period 22) are determined. To be specific, it is determined that the STA 1 communicates with the AP 1 in the communications time period 12 over the data channel 1 (Data CH 1), and that the STA 2 communicates with the AP 1 in the communications time period 22 over the data channel 2 (Data CH 2). In some embodiments, the first access point may further comprehensively determine, based on channel quality of each data channel, a communications time period of the STA 1 and a communications time period of the STA 2.

For uplink transmission, each station may separately send the transmission requirement to the first access point, and the first access point may determine, based on the transmission requirement sent by each station, the location and the length, on the time axis, of the at least one first data channel and/or the at least one first time period. For example, the transmission requirement may include information such as the size of to-be-transmitted data and the transmission priority. For example, two first data channels (the data channel 1 and the data channel 2) and two first time periods (the communications time period 12 and the communications time period 22) are determined. To be specific, it is determined that the STA 1 communicates with the AP 1 in the communications time period 12 over the data channel 1 (Data CH 1), and that the STA 2 communicates with the AP 1 in the communications time period 22 over the data channel 2 (Data CH 2). In some embodiments, the first access point may further comprehensively determine, based on channel quality of each data channel, a communications time period of the STA 1 and a communications time period of the STA 2.

It should be noted that a rule used by the first access point to determine the communications time period for a data channel of the STA 1 may be the same as or different from a rule used by the first access point to determine the communications time period for a data channel of the STA 2.

Step 302: The first access point communicates with the plurality of stations in the at least one first time period over the at least one first data channel.

The foregoing example is used for further explanation and description. The first access point may communicate with the STA 1 in the communications time period 12 over the data channel 1 (Data CH 1), and communicate with the STA 2 in the communications time period 22 over the data channel 2 (Data CH 2).

In this embodiment, the first access point sends, over the common control channel, the first transmission allocation frame to the plurality of stations. The first transmission allocation frame is used to indicate the plurality of stations to communicate with the first access point in the at least one first time period over the at least one first data channel. Each station communicates with the first access point in the first time period over the corresponding first data channel, and sends the first transmission allocation frame over the common control channel, to indicate data channels over which the plurality of stations communicate with the first access point, and time periods. In this way, control and data transmission are separated on different channels. This reduces heavy dependence on a primary channel, and can improve channel utilization.

For explanation and description of the first transmission allocation frame, in another implementation, the first transmission allocation frame may include at least one piece of channel allocation information. The at least one piece of channel allocation information may include channel allocation information 1 (Allocation 1), . . . , and channel allocation information n (Allocation n), where n is any positive integer.

In an implementation, each piece of channel allocation information is corresponding to one first time period for one first data channel. Each piece of channel allocation information includes channel information (Channel information), time information (Time information), and station information. The channel information is used to indicate one first data channel, the time information is used to indicate one first time period, and the station information is used to indicate at least one station that communicates with the first access point in the first time period over the first data channel.

For example, the first transmission allocation frame may include two pieces of channel allocation information: the channel allocation information 1 (Allocation 1) and the channel allocation information 2 (Allocation 2). The channel allocation information 1 (Allocation 1) is corresponding to the communications time period 12 over the data channel (Data CH 1). Channel information in the channel allocation information 1 (Allocation 1) is used to indicate the data channel (Data CH 1), time information in the channel allocation information 1 (Allocation 1) is used to indicate the communications time period 12, and station information in the channel allocation information 1 (Allocation 1) is used to indicate the STA 1. The channel allocation information 2 (Allocation 2) is corresponding to the communications time period 22 over the data channel (Data CH 2). Channel information in the channel allocation information 2 (Allocation 2) is used to indicate the data channel (Data CH 2), time information in the channel allocation information 2 (Allocation 2) is used to indicate the communications time period 22, and station information in the channel allocation information 2 (Allocation 2) is used to indicate the STA 2.

Each piece of channel information (Channel information) may include at least one of an operating class (operating class), a band identifier (band ID), or a channel index (channel index). Each piece of time information (Time information) may include a start time (start time) and duration (Duration). For specific explanation and description thereof, refer to the foregoing embodiment. Details are not described herein again.

In some embodiments, the first transmission allocation frame may further include uplink and downlink indication information and traffic limitation information (Traffic limitation information).

For explanation and description of the uplink and downlink indication information and the traffic type, refer to the explanation and the description in the foregoing embodiment. Details are not described herein again.

In some embodiments, the station information in each piece of channel allocation information may include a quantity of STAs (Number of STAs) and an association identifier (Association ID, AID) list of STAs (AID list of STAs). The quantity of STAs is used to indicate a quantity of STAs that communicate with the first access point in a first time period over a corresponding first data channel. The AID list of STAs is used to indicate STAs that communicate with the first access point in a first time period over a corresponding first data channel.

FIG. 9A is a schematic diagram of another transmission allocation frame according to an embodiment of this application. As shown in FIG. 9A, the transmission allocation frame may include a frame control field, a duration field, a receiver address (RA) field, a transmitter address (TA) field, a channel information field, a quantity of allocations (Number of Allocations) field, a channel allocation information 1 (Allocation 1) field, . . . , a channel allocation information n (Allocation n) field, and a frame sequence check (FCS) field.

The channel allocation information 1 (Allocation 1) field is used to carry corresponding channel allocation information, . . . , and the channel allocation information n (Allocation n) field is used to carry corresponding channel allocation information. For specific explanation and description of the channel allocation information, refer to the foregoing embodiment. Details are not described herein again.

The quantity of allocations field is used to indicate a quantity n of pieces of channel allocation information.

The duration field is used to indicate duration occupied by the transmission allocation frame. The receiver address (RA) field may include a broadcast address. The transmitter address (TA) field may include an address of a transmit node, for example, a MAC address of the transmit node. The embodiment shown in FIG. 8 is used as an example. A TA of the first transmission allocation frame may include a MAC address of the first access point. The frame sequence check (FCS) field is used by a receiver to determine whether the transmission allocation frame is correctly received.

Optionally, after correctly receiving the transmission allocation frame, each station may send an acknowledgment (ACK) to the first access point.

It should be noted that the transmission allocation frame shown in FIG. 9A may also be applicable to one station.

FIG. 9B is a schematic diagram of a channel allocation information field in the transmission allocation frame shown in FIG. 9A according to an embodiment of this application. As shown in FIG. 9B, the channel allocation information field may include a channel information subfield, a time information subfield, a traffic limitation information subfield, a quantity of STAs (Number of STAs) subfield, and an AID list of STAs (AID list of STAs) subfield. To be specific, a same time period for a same data channel may be allocated to a plurality of STAs, or a plurality of time periods for a plurality of data channels may be allocated to a plurality of STAs.

The foregoing subfields are used to carry corresponding information such as the foregoing channel information, time information, traffic limitation information, a quantity of STAs (Number of STAs), and an AID list of STAs (AID list of STAs). For specific explanation and description thereof, refer to the foregoing embodiment. Details are not described herein again.

In this embodiment, the transmission allocation frame is set to carry at least one piece of channel allocation information, so that a plurality of stations receiving the transmission allocation frame over a common control channel determine to perform communication of data of a corresponding traffic type with the first access point in at least one first time period over at least one first data channel. Therefore, this meets communications requirements of data of different traffic types.

It should be noted that the field information of the transmission allocation frame is used as an example for description, and a sequence of the field information is not limited thereto. The transmission allocation frame may further include other field information, which may be flexibly set based on a requirement.

In another implementation, each piece of channel allocation information is corresponding to a first time period, for a first data channel, used by one station to communicate with the first access point, and each piece of channel allocation information includes station information, channel information, and time information. The station information is used to indicate one station that communicates with the first access point, the channel information is used to indicate one first data channel corresponding to the station, and the time information is used to indicate one first time period corresponding to the station.

For example, the first transmission allocation frame may include two pieces of channel allocation information: the channel allocation information 1 (Allocation 1) and the channel allocation information 2 (Allocation 2). The channel allocation information 1 (Allocation 1) is corresponding to a communications time period 12 over a data channel (Data CH 1) used by a STA 1 to communicate with the first access point. The channel allocation information 1 (Allocation 1) may include station information, channel information, and time information. The station information is used to indicate the STA 1, the channel information is used to indicate the data channel (Data CH 1), and the time information is used to indicate the communications time period 12. The channel allocation information 2 (Allocation 2) is corresponding to a communications time period 22, for a data channel (Data CH 2), used by a STA 2 to communicate with the first access point. The channel allocation information 2 (Allocation 2) may include station information, channel information, and time information. The station information is used to indicate the STA 2, the channel information is used to indicate the data channel (Data CH 2), and the time information is used to indicate the communications time period 22.

Each piece of channel information may include at least one of an operating class, a band identifier (band ID), or a channel index. Each piece of time information may include a start time and duration. For specific explanation and description thereof, refer to the foregoing embodiment. Details are not described herein again.

In some embodiments, the first transmission allocation frame may further include uplink and downlink indication information and traffic limitation information.

For explanation and description of the uplink and downlink indication information and a traffic type, refer to the explanation and the description in the foregoing embodiment. Details are not described herein again.

In some embodiments, the station information in each piece of channel allocation information may include an AID of a STA (AID of a STA). The AID of a STA is used to indicate a corresponding STA.

FIG. 10 is a schematic diagram of a channel allocation information field in the transmission allocation frame shown in FIG. 9A according to an embodiment of this application. As shown in FIG. 9, the channel allocation information field may include an AID of a STA (AID of a STA) subfield, the channel information subfield, the time information subfield, and the traffic limitation information subfield.

Each field is used to carry corresponding information such as the channel information, the time information, the traffic limitation information, and the AID of a STA (AID of a STA). For specific explanation and description thereof, refer to the foregoing embodiment. Details are not described herein again.

It should be noted that the field information of the channel allocation information is used as an example for description, and a sequence of the field information is not limited thereto. The channel allocation information may further include other field information, which may be flexibly set based on a requirement.

For uplink transmission, as shown by a dashed line in FIG. 8, before step 301, the wireless communications method in the embodiment of this application may further include the following step: A plurality of first stations send transmission requirement frames to the first access point over the common control channel, and the first access point receives, over the common control channel, the transmission requirement frames sent by the plurality of stations, where one transmission requirement frame is used to report an uplink transmission requirement of one station. The first access point generates the first transmission allocation frame based on the transmission requirement frames sent by the plurality of stations.

The transmission requirement frame sent by each station may be the transmission requirement frame described in FIG. 6 and FIG. 7A. Details are not described herein again.

For downlink transmission, before step 301, the wireless communications method in the embodiment of this application may further include the following step: The first access point determines, based on the transmission requirement of the first access point, the data channel over which the first access point communicates with the plurality of stations, and the time period, and further generates the first transmission allocation frame.

FIG. 11 is a flowchart of another wireless communications method according to an embodiment of this application. As shown in FIG. 11, this embodiment relates to a first access point and a second access point. For example, the first access point may be the AP 1 shown in FIG. 1, and the second access point may be the AP 2 shown in FIG. 1. The method in this embodiment may include the following steps.

Step 401: The first access point receives, over a common control channel, a third transmission allocation frame sent by the second access point.

The second access point sends the third transmission allocation frame over the common control channel. Because the first access point and the second access point share the common control channel, the first access point may receive the third transmission allocation frame. The third transmission allocation frame is used to indicate a second station to communicate with the second access point in a second time period over a second data channel.

The third transmission allocation frame may be the transmission allocation frame described in FIG. 5, and FIG. 9A to FIG. 10. Details are not described herein again.

Step 402: The first access point updates a network allocation vector (NAV) table based on the third transmission allocation frame.

The NAV table includes a correspondence between a plurality of groups of data channels and time periods. A group of data channels and a time period are used to indicate that one time period for one data channel is occupied. In some embodiments, the NAV table may further include station information. The station information is corresponding to a group of data channels and a time period, and is used to indicate a station occupying one time period for one data channel. An updated NAV table includes channel information used to indicate the second data channel and time information used to indicate the second time period.

In an implementation in which the NAV table is updated based on the third transmission allocation frame, the data channel and the time period that are indicated by the third transmission allocation frame are added to the original NAV table. In an example, a row in the NAV table represents a correspondence between a group of data channels and a time period, and the row in the NAV table includes channel information, and a start time and duration of the time period. In another example, a row in the NAV table includes channel information, and a start time and an end time of a time period. In still another example, a row in the NAV table includes channel information, and an end time and duration of a time period.

The row of the NAV table of any one of the foregoing examples may further include station information indicating a station, for example a holder, that is allocated to a time period to perform communication over a data channel. The station information may be a MAC address of the station. When broadcast data is transmitted in the time period over the data channel, the station information may be a broadcast address.

For example, a schematic diagram of an NAV table is shown in Table 2. As shown in Table 2, the NAV table includes a plurality of rows, and each row records that one time period for one data channel is occupied by at least one station. As shown in Table 2, a data channel 1 (CH 1) is occupied by a STA 1 from a moment t1 to a moment t1+T1, and a data channel 2 (CH 2) is occupied by a STA 2 from a moment t2 to a moment t2+T2.

TABLE 2

Example of an NAV Table

| Channel information | Start time | Duration | Holder |
|---|---|---|---|
| CH 1 | t1 | T1 | MAC address of a STA 1 (MAC Address of a STA 1) |
| CH 2 | t2 | T2 | MAC address of a STA 2 (MAC Address of a STA 2) |

In the foregoing step 401, the first access point receives the third transmission allocation frame. In an example, if the third transmission allocation frame is used to indicate a STA 3 to communicate with the first access point from a moment t3 to a moment t3+T3 of the data channel 1 (CH 1), step 402 is performed, that is, the first access point updates the NAV table shown in Table 2, to obtain an NAV table shown in Table 3.

TABLE 3

Example of an NAV Table

| Channel information | Start time | Duration | Holder |
|---|---|---|---|
| CH 1 | t1 | T1 | MAC address of a STA 1 (MAC Address of a STA 1) |
| CH 2 | t2 | T2 | MAC address of a STA 2 (MAC Address of a STA 2) |
| CH 1 | t3 | T3 | MAC address of a STA 3 (MAC Address of a STA 3) |
| ... | ... | ... | ... |

In the foregoing embodiment, the first access point is used as an example for description. It may be understood that the second access point may also maintain an NAV table of the second access point in a same manner.

It should be noted that the holders in Table 2 and Table 3 may alternatively be broadcast addresses, and the foregoing MAC addresses are merely examples.

In this embodiment, a transmission allocation frame of a neighboring access point is received, and an NAV table of an access point is maintained, to implement proper coordinated allocation of channel resources in a multi-access point application scenario. This reduces transmission collisions of a plurality of access points, and improves communication efficiency and reliability. Neighboring access points may use a same common control channel to reduce or avoid collisions between a plurality of BSSs.

In the wireless communications method of this application, only CCA listening is performed, and backoff during initial access is not performed. At a start point of a scheduling period (for example, the foregoing first time period) or a later time point, if a CCA result is idle, a transmit end (the access point or the station) directly performs sending. However, when a transmission error occurs, a backoff operation is performed according to a standard in a conventional technology.

Table 3 shows a comparison between the channel access mode in this solution, and a PSMP in a conventional technology and a RAW access mode introduced by IEEE 802.11ah.

TABLE 3

Comparison of access modes in a scheduling period

| | CCA | Backoff |
|---|---|---|
| RAW | Yes | Yes |
| PSMP | No | No |
| This solution | Yes | No |

In this embodiment, the foregoing access mode can improve channel utilization and data transmission efficiency.

Figure 12:
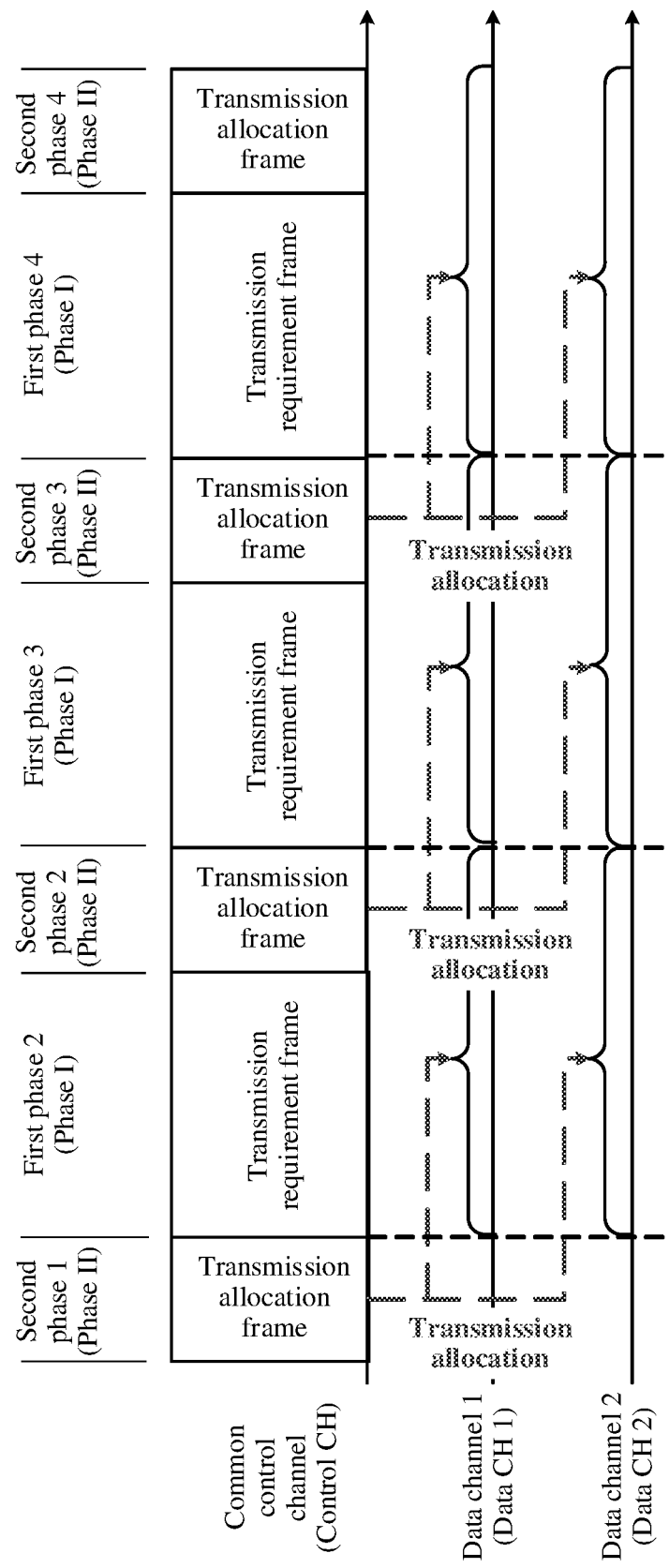
FIG. 12 is a schematic diagram of channel slotting according to an embodiment of this application.

For the common control channel in any one of the foregoing embodiments, an access point may receive, in a first phase of the common control channel, a transmission requirement frame sent by a station, and send a transmission allocation frame to the station in a second phase of the common control channel, to indicate the station to communicate with the access point in a time period in a next slot of a slot in which the second phase is located. As an example, FIG. 12 is a schematic diagram of channel slotting according to an embodiment of this application. As shown in FIG. 12, a common control channel includes a plurality of slots, and each slot includes a first phase (Phase I) and a second phase (Phase II).

The first phase is used to receive a transmission requirement frame sent by at least one station. The second phase is used to send a first transmission allocation frame to the at least one station. At least one first time period indicated by the first transmission allocation frame is a time period in a next slot of a slot in which the second phase is located. The first transmission allocation frame may allocate, to a station, a data channel for performing communication, and a time period, and a frame structure of the first transmission allocation frame may be the frame structure shown in FIG. 5. The first transmission allocation frame may also allocate, to a plurality of stations, a data channel for performing communication, and a time period, and a frame structure of the first transmission allocation frame may be the frame structure shown in FIG. 9A and FIG. 9B, and FIG. 10.

In this embodiment, time synchronization and slot division may be implemented by using a beacon (Becon) frame.

For example, in a first phase 2 shown in FIG. 12, on one hand, an access point may collect a transmission requirement frame sent by each station, and on the other hand, the access point communicates with the station over a data channel based on the first transmission allocation frame sent in a second phase 1 in a previous slot. For example, communication may be performed in a first phase 2 and a second phase 2 that are of a data channel 1 (Data CH 1).

As shown in FIG. 12, in a second phase 2, the station is prohibited from performing uplink EDCA, and the access point sends the first transmission allocation frame to the station over the common control channel in the second phase 2, to implement transmission resource allocation of the data channel.

In this embodiment, each slot includes the first phase (Phase I) and the second phase (Phase II) through setting. The first phase is used to receive the transmission requirement frame sent by the at least one station, and the second phase is used to send the first transmission allocation frame to the at least one station. The at least one first time period indicated by the first transmission allocation frame is the time period in the next slot of a slot in which the second phase is located. A time of the common control channel is divided into slots, so that a time granularity is smaller and flexibility is higher. This avoids a problem in which a high-priority traffic cannot be promptly transmitted because transmission occupies the common control channel for a long time, and reduces a traffic transmission delay.

Figure 13A:
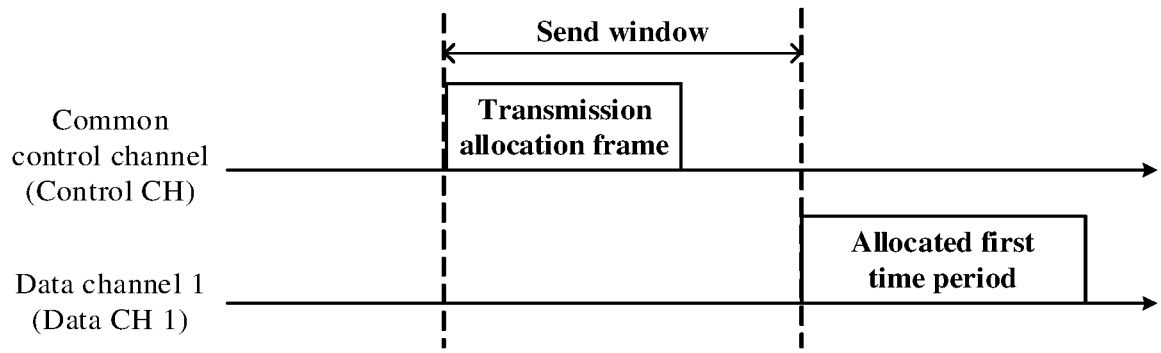
FIG. 13A is a schematic diagram of a sending time of a transmission allocation frame according to an embodiment of this application.

FIG. 13A is a schematic diagram of a sending time of a transmission allocation frame according to an embodiment of this application. As shown in FIG. 13A, a first access point sends a transmission allocation frame in a send window over a common control channel, and the transmission allocation frame may be the transmission allocation frame in any one of the foregoing embodiments.

Duration of the send window is less than first preset duration T, and an end point of the send window is a start point of a first time period allocated by the transmission allocation frame. When the transmission allocation frame indicates one time period for one data channel, the end point of the send window is a start point of the time period. When the transmission allocation frame indicates a plurality of time periods for one data channel, the end point of the send window is a start point of a farthest first time period in the plurality of time periods.

The first preset duration T may be preset, T is a positive integer, and a value of the first preset duration T may be flexibly set based on a requirement.

Figure 13B:
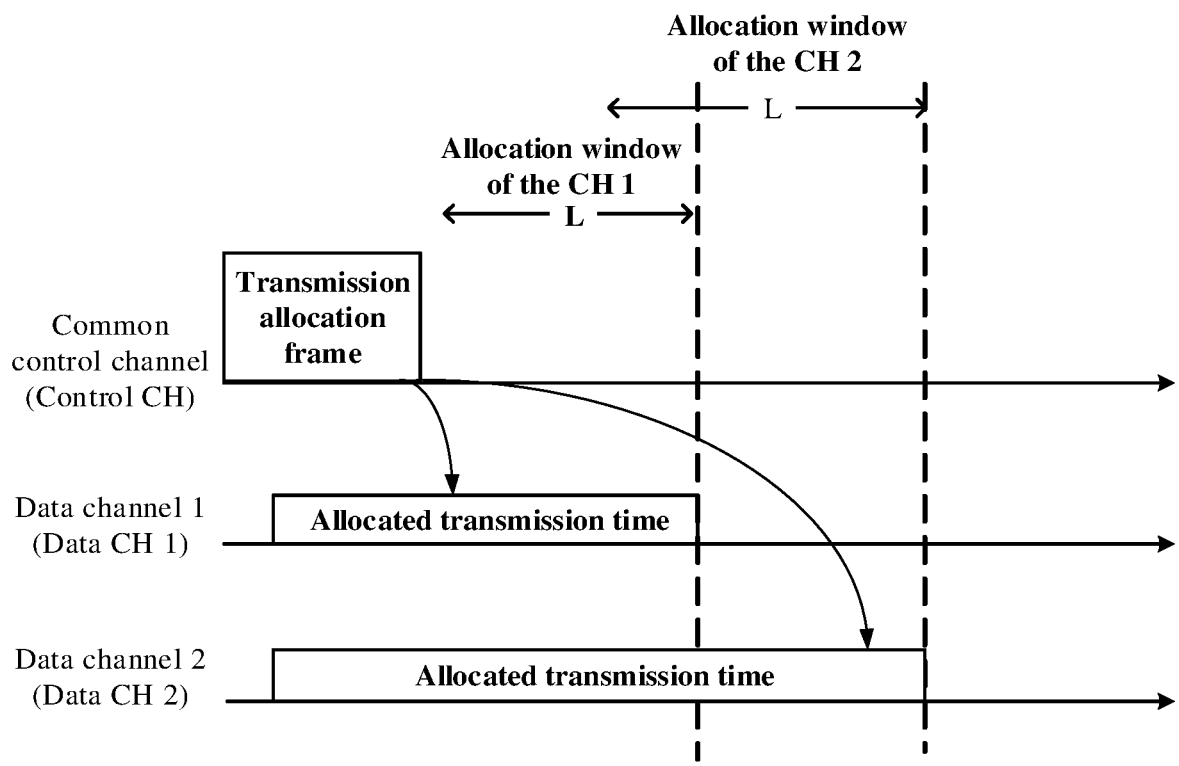
FIG. 13B is a schematic diagram of a sending time of another transmission allocation frame according to an embodiment of this application.

FIG. 13B is a schematic diagram of a sending time of another transmission allocation frame according to an embodiment of this application. As shown in FIG. 13B, a first access point sends a first transmission allocation frame in a send window over a common control channel.

Duration of the send window is less than second preset duration L, and an end point of the send window is an end point of an allocated time period. The allocated time period is a time period, for performing communication, indicated by a second transmission allocation frame sent by the first access point before sending the first transmission allocation frame.

In an implementation, as shown in FIG. 13B, different send windows are set for different data channels, for example, an allocation window of a data channel 1 and an allocation window of a data channel 2. Duration of the allocation window of the data channel 1 is less than the second preset duration L. An end point of the allocation window of the data channel 1 is an end point of an allocated time period for the data channel 1. Duration of the allocation window of the data channel 2 is less than the second preset duration L. An end point of the allocation window of the data channel 2 is an end point of an allocated time period for the data channel 2.

In this embodiment, time synchronization between access points is not required. Therefore, an interval between a time period, for performing communication, allocated by the first transmission allocation frame and a sending time of the first transmission allocation frame is within preset duration. In this way, communications flexibility is higher. This avoids a problem in which a high-priority traffic cannot be promptly transmitted because transmission occupies the common control channel for a long time, and reduces a traffic transmission delay.

The foregoing describes in detail the wireless communications methods according to the embodiments of this application, and the following describes wireless communications apparatuses according to the embodiments of this application.

The embodiments of this application describe in detail schematic structures of the wireless communications apparatuses.

Figure 14:
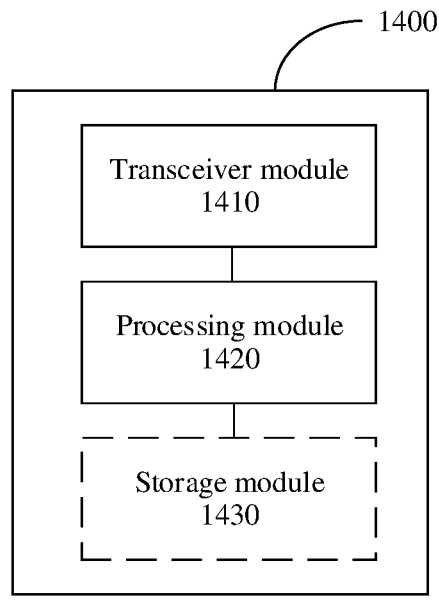
FIG. 14 is a schematic diagram of a structure of a wireless communications apparatus according to an embodiment of this application.

In an example, FIG. 14 is a schematic block diagram of a wireless communications apparatus 1400 according to an embodiment of this application. The apparatus 1400 in this embodiment of this application may be the station in the foregoing method embodiment, or may be one or more chips in a station. The apparatus 1400 may be configured to perform some or all functions of the station in the foregoing method embodiment. The apparatus 1400 may include a transceiver module 1410 and a processing module 1420. Optionally, the apparatus 1400 may further include a storage module 1430.

For example, the transceiver module 1410 may be configured to receive the first transmission allocation frame from the first access point in step S101 in the foregoing method embodiment; configured to: perform step S201, and receive the first transmission allocation frame from the first access point in step 202; or configured to receive the first transmission allocation frame from the first access point in step S301.

The processing module 1420 may be configured to perform step S102, step S203, or step S302 in the foregoing method embodiments.

Alternatively, the apparatus 1400 may be configured as a universal processing system, which, for example, is generally referred to as a chip. The processing module 1420 may include one or more processors that provide a processing function. The transceiver module 1410 may be, for example, an input/output interface, a pin, or a circuit. The input/output interface may be responsible for information exchange between the chip system and the outside. For example, the input/output interface may output a transmission requirement frame of a station to another module outside the chip for processing. The processing module may execute computer-executable instructions stored in the storage module, to implement the function of the station in the foregoing method embodiment. In an example, the storage module 1430 optionally included in the apparatus 1400 may be a storage unit in the chip, for example, a register or a cache. Alternatively, the storage module 1430 may be a storage unit that is in the station but outside the chip, for example, a read-only memory (read-only memory, ROM for short) or another type of static storage device that can store static information and instructions, or a random access memory (RAM).

Figure 15:
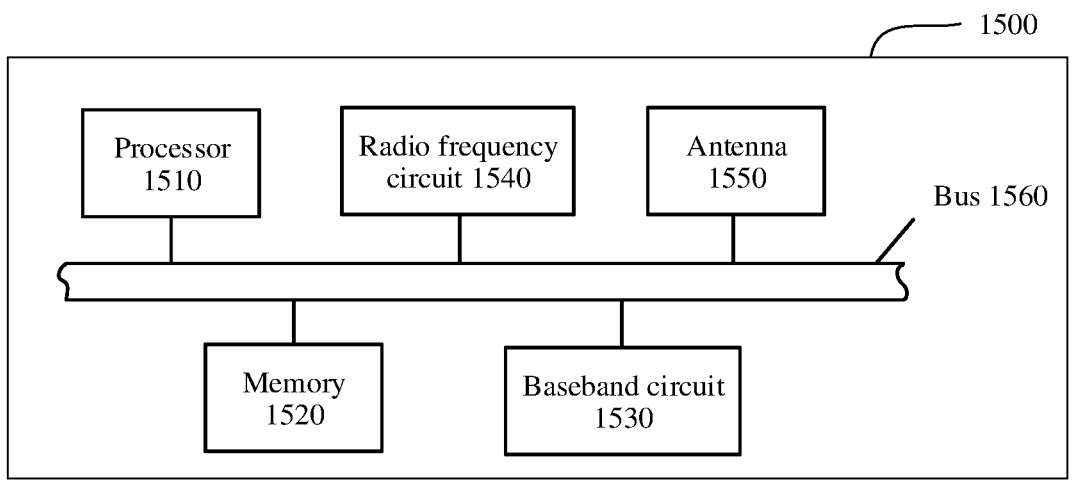
FIG. 15 is a schematic diagram of a structure of another wireless communications apparatus according to an embodiment of this application.

In another example, FIG. 15 is a schematic block diagram of another wireless communications apparatus 1500 according to an embodiment of this application. The apparatus 1500 in this embodiment of this application may be the station in the foregoing method embodiment, and the apparatus 1500 may be configured to perform some or all functions of the station in the foregoing method embodiment. The apparatus 1500 may include a processor 1510, a baseband circuit 1530, a radio frequency circuit 1540, and an antenna 1550. Optionally, the apparatus 1500 may further include a memory 1520. Components of the apparatus 1500 are coupled together through a bus 1560. In addition to a data bus, the bus system 1560 includes a power bus, a control bus, and a status signal bus. However, for clear description, various types of buses in the figure are marked as the bus system 1560.

The processor 1510 may be configured to control the station, and configured to perform processing performed by the station in the foregoing embodiment. The processor 1510 may perform a processing process related to the station in the foregoing method embodiment and/or configured to perform another process of the technology described in this application. Further, the processor 1510 may run an operating system, be responsible for managing the bus, and execute a program or instructions stored in the memory.

The baseband circuit 1530, the radio frequency circuit 1540, and the antenna 1550 may be configured to support information receiving and sending between the station and the access point in the foregoing embodiment, to support wireless communication between the station and the access point. In an example, a first transmission allocation frame sent by the access point is received by using the antenna 1550, processed by the radio frequency circuit 1540 through processing such as filtering, amplification, down-conversion, and digitization, processed by the baseband circuit 1530 through baseband processing such as decoding and protocol-based data decapsulation, and processed by the processor 1510, to restore traffic data and signaling information that are sent by the access point. In still another example, a transmission requirement frame, of the station, indicating a transmission requirement of the station may be processed by the processor 1510, processed by the baseband circuit 1530 through baseband processing such as protocol-based encapsulation and encoding, further processed by the radio frequency circuit 1540 through radio frequency processing such as analog conversion, filtering, amplification, and up-conversion, and transmitted by using the antenna 1550.

The memory 1520 may be configured to store program code and data of the station, and the memory 1520 may be the storage module 1430 in FIG. 14. It can be understood that the baseband circuit 1530, the radio frequency circuit 1540, and the antenna 1550 may be further configured to support communication between the station and another network entity, for example, communication between the station and a network element on a core network side. The memory 1520 in FIG. 15 is shown as being separated from the processor 1510. However, a person skilled in the art easily understands that the memory 1520 or any part of the memory 1520 may be located outside the wireless communications apparatus 1500. For example, the memory 1520 may include a transmission cable and/or a computer product separated from a wireless node. These media may be accessed by the processor 1510 through the bus interface 1560. Alternatively, the memory 1520 or any portion thereof may be integrated into the processor 1510. For example, the memory 1520 or any portion thereof may be a cache and/or a general-purpose register.

It may be understood that, FIG. 15 shows only a simplified design of the station. For example, in actual application, the station may include any quantity of transmitters, receivers, processors, memories, and the like, and all stations that can implement this application fall within the protection scope of this application.

In a possible implementation, the wireless communications apparatus may alternatively be implemented by using the following: one or more field programmable gate arrays (FPGA), a programmable logic device (PLD), a controller, a state machine, gate logic, a discrete hardware component, any other proper circuit, or any combination of circuits that can perform various functions described in this application. In another example, an embodiment of this application further provides a computer storage medium. The computer storage medium may store program instructions used to indicate any one of the foregoing methods, so that a processor executes the program instructions to implement the method and the function that are related to the station in the foregoing method embodiments.

Figure 16:
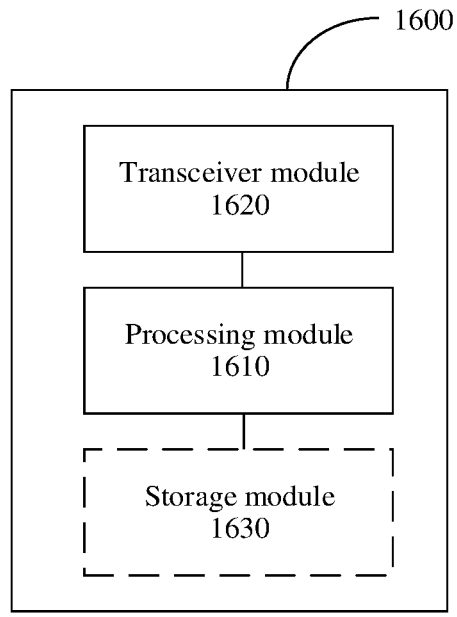
FIG. 16 is a schematic diagram of a structure of still another wireless communications apparatus according to an embodiment of this application.

The embodiments of this application describe in detail schematic structures of the wireless communications apparatuses. In an example, FIG. 16 is a schematic block diagram of a wireless communications apparatus 1600 according to an embodiment of this application. The apparatus 1600 in this embodiment of this application may be the access point in the foregoing method embodiment, or may be one or more chips in an access point. The apparatus 1600 may be configured to perform some or all functions of the access point in the foregoing method embodiment. The apparatus 1600 may include a processing module 1610 and a transceiver module 1620. Optionally, the apparatus 1600 may further include a storage module 1630.

For example, the transceiver module 1620 may be configured to send the first transmission allocation frame in step S101 in the foregoing method embodiment; configured to: receive the transmission requirement frame from the station in step S201, and send the first transmission allocation frame in step S202; configured to send the first transmission allocation frame in step S301; or configured to receive the third transmission allocation frame from the second access point in step S401.

The processing module 1610 may be configured to perform step S102, step S203, step S302, or step S402 in the foregoing method embodiments.

Alternatively, the apparatus 1600 may be configured as a universal processing system, which, for example, is generally referred to as a chip. The processing module 1610 may include one or more processors that provide a processing function. The transceiver module may be, for example, an input/output interface, a pin, or a circuit. The input/output interface may be responsible for information exchange between the chip system and the outside. For example, the input/output interface may output the first transmission allocation frame to another module outside the chip for processing. The one or more processors may execute computer-executable instructions stored in the storage module, to implement the function of the access point in the foregoing method embodiment. In an example, the storage module 1630 optionally included in the apparatus 1600 may be a storage unit in the chip, for example, a register or a cache. Alternatively, the storage module 1630 may be a storage unit that is in the access point but outside the chip, for example, a read-only memory (ROM) or another type of static storage device that can store static information and instructions, or a random access memory (RAM).

Figure 17:
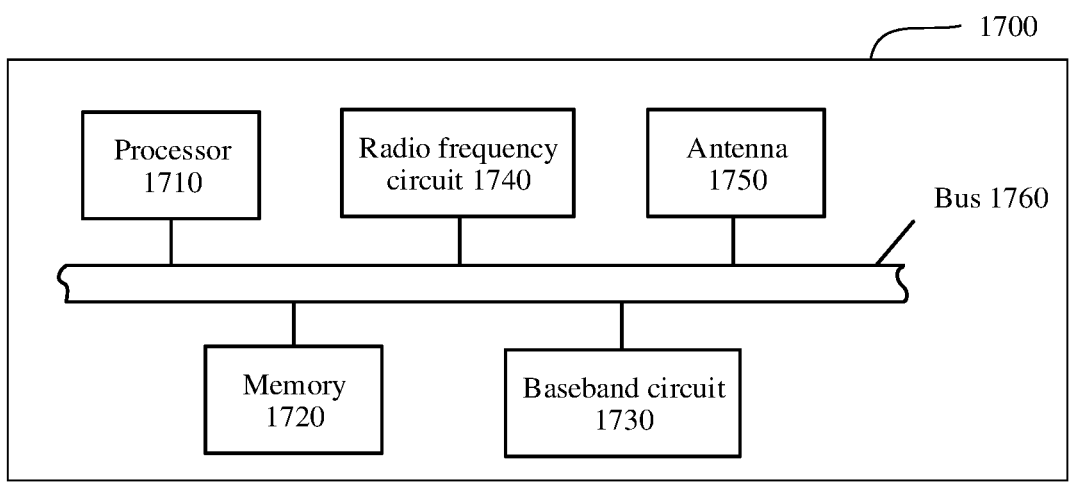
FIG. 17 is a schematic diagram of a structure of yet another wireless communications apparatus according to an embodiment of this application.

In another example, FIG. 17 is a schematic block diagram of another wireless communications apparatus 1700 according to an embodiment of this application. The apparatus 1700 in this embodiment of this application may be the access point in the foregoing method embodiment, and the apparatus 1700 may be configured to perform some or all functions of the access point in the foregoing method embodiment. The apparatus 1700 may include a processor 1710, a baseband circuit 1730, a radio frequency circuit 1740, and an antenna 1750. Optionally, the apparatus 1700 may further include a memory 1720. Components of the apparatus 1700 are coupled together through a bus 1760. In addition to a data bus, the bus system 1760 includes a power bus, a control bus, and a status signal bus. However, for clear description, various types of buses in the figure are marked as the bus system 1760.

The processor 1710 may be configured to control the access point, and configured to perform processing performed by the access point in the foregoing embodiment. The processor 1710 may perform a processing process related to the access point in the foregoing method embodiment and/or configured to perform another process of the technology described in this application. Further, the processor 1710 may run an operating system, be responsible for managing the bus, and execute a program or instructions stored in the memory.

The baseband circuit 1730, the radio frequency circuit 1740, and the antenna 1750 may be configured to support information receiving and sending between the access point and the station in the foregoing embodiment, to support wireless communication between the access point and the station. In an example, a transmission requirement frame sent by the station is received by using the antenna 1750, processed by the radio frequency circuit through filtering, amplification, down-conversion, digitization, and the like, then processed by the baseband circuit baseband through baseband processing such as decoding and protocol-based data decapsulation, and processed by the processor 1710, to restore traffic data and signaling information that are sent by the station. In another example, a first transmission allocation frame of the access point may be processed by the processor 1710, processed by the baseband circuit 1730 through baseband processing such as protocol-based encapsulation and encoding, further processed by the radio frequency circuit 1740 through radio frequency processing such as analog conversion, filtering, amplification, and up-conversion, and transmitted by using the antenna 1750. The memory 1720 may be configured to store program code and data of the access point, and the memory 1720 may be the storage module 1630 in FIG. 16. It may be understood that the baseband circuit 1730, the radio frequency circuit 1740, and the antenna 1750 may be further configured to support communication between the access point and another network entity, for example, communication between the access point and another access point.

It may be understood that, FIG. 17 shows only a simplified design of the access point. For example, in actual application, the access point may include any quantity of transmitters, receivers, processors, memories, and the like, and all access points that can implement this application fall within the protection scope of this application.

In a possible implementation, the wireless communications apparatus may alternatively be implemented by using the following: one or more field programmable gate arrays (field programmable gate array, FPGA), a programmable logic device (programmable logic device, PLD), a controller, a state machine, gate logic, a discrete hardware component, any other proper circuit, or any combination of circuits that can perform various functions described in this application.

In another example, an embodiment of this application further provides a computer storage medium. The computer storage medium may store program instructions used to indicate any one of the foregoing methods, so that a processor executes the program instructions to implement the method and the function that are related to the access point in the foregoing method embodiments.

The processor in each of the apparatus 1500 and the apparatus 1700 may be a general-purpose processor, for example, a general-purpose central processing unit (CPU), a network processor (NP), a microprocessor, or the like; or may be an application-specific integrated circuit (ASIC), or one or more integrated circuits configured to control program execution in the solution of this application. The processor may also be a digital signal processor (DSP), a field programmable gate array (FPGA) or another programmable logic device, a discrete gate or a transistor logic device, or a discrete hardware component. Alternatively, a controller/processor may be a combination of processors implementing a computing function, for example, a combination of one or more microprocessors, or a combination of the DSP and the microprocessor. The processor usually performs logical and arithmetic operations according to program instructions stored in the memory.

The memory in each of the apparatus 1500 and the apparatus 1700 may further store an operating system and another application program. Specifically, the program may include program code, and the program code includes computer operation instructions. More specifically, the memory may be a read-only memory (ROM), another type of static storage device that can store static information and instructions, a random access memory (RAM), another type of dynamic storage device that can store information and instructions, or a magnetic disk storage, or the like. The memory may be a combination of the foregoing memories. In addition, the computer-readable storage medium/memory may be located in the processor, or may be located outside the processor, or distributed in a plurality of entities including the processor or a processing circuit. The computer-readable storage medium/memory may be specifically embodied in a computer program product. For example, the computer program product may include a computer-readable medium in a packaging material.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a special-purpose computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

What is claimed is:

1. A method, comprising:
  receiving, by a station over a common control channel, a first transmission allocation frame sent by a first access point, wherein the first transmission allocation frame indicates to the station to communicate with the first access point in a first time period over a first data channel, the first transmission allocation frame comprises channel information and time information, the channel information indicates the first data channel, and the time information indicates the first time period; and
  communicating, by the station, with the first access point in the first time period over the first data channel in response to accessing the first data channel in the first time period,
  wherein a transmission requirement frame comprises at least one of aperiodic traffic indication information or periodic traffic indication information, the aperiodic traffic indication information comprises traffic type indication information and a size of to-be-transmitted data of at least one traffic type, and the traffic type indication information indicates the at least one traffic type, wherein the periodic traffic information comprises communications stream indication information and attribute information of at least one communications stream, the communications stream indication information indicates the at least one communications stream, and wherein the transmission requirement frame is sent by the station to the first access point over the common control channel.

2. The method according to claim 1, wherein the first transmission allocation frame further comprises at least one of uplink or downlink indication information or traffic limitation information, the uplink or downlink indication information indicates a transmission type of communication performed in the first time period over the first data channel, and the transmission type is downlink transmission, single-user uplink transmission, or multi-user uplink transmission, and wherein the traffic limitation information indicates a traffic type of communication performed in the first time period over the first data channel.

3. The method according to claim 1, further comprising:
  switching, by the station, to the common control channel in response to the station failing to access the first data channel within a stay duration in the first time period or within the first time period.

4. The method according to claim 3, wherein the first transmission allocation frame further comprises stay duration indication information, and the stay duration indication information indicates the stay duration.

5. The method according to claim 1, wherein the common control channel comprises a plurality of slots, each slot of the plurality of slots comprises a first phase and a second phase, the station sends the transmission requirement frame in a first phase of a first slot of the plurality of slots, the station receives the first transmission allocation frame in a second phase of a second slot of the plurality of slots, the first time period of the first transmission allocation frame is a time period in a next slot of the slot in which the second phase is located of the second slot, and the first slot and the second slot are the same slot or different slots.

6. A method, comprising:
  sending, by a first access point over a common control channel, a first transmission allocation frame to a first station, wherein the first transmission allocation frame indicates to the first station to communicate with the first access point in a first time period over a first data channel, the first transmission allocation frame comprises at least one piece of channel information and at least one piece of time information, each piece of channel information indicates at least one first data channel, and each piece of time information indicates at least one first time period; and
  communicating, by the first access point, with the first station in the at least one first time period over the at least one first data channel,
  wherein sending, by the first access point over the common control channel, the first transmission allocation frame to the first station comprises:
    sending, by the first access point, the first transmission allocation frame to the first station in a send window over the common control channel, and wherein:
      a duration of the send window is less than a first preset duration T, and an end point of the send window is a start point of a latest first time period in the at least one first time period, or
      the duration of the send window is less than a second preset duration L, the end point of the send window is an end point of an allocated time period, and the allocated time period is a time period for performing communication that is indicated by a second transmission allocation frame sent by the first access point before the first access point sends the first transmission allocation frame.

7. The method according to claim 6, wherein the common control channel comprises a plurality of slots, each slot comprises a first phase and a second phase, the first station receives a transmission requirement frame sent by the first station, the first transmission allocation frame is sent to the first station in a second phase of a second slot, and the at least one first time period indicated by the first transmission allocation frame is comprised in a next slot of the second slot in which the second phase is located.

8. The method according to claim 6, wherein the first transmission allocation frame further comprises at least one of uplink or downlink indication information or traffic limitation information, the uplink or downlink indication information indicates a transmission type of communication performed in the at least one first time period over the at least one first data channel, and the transmission type is downlink transmission, single-user uplink transmission, or multi-user uplink transmission; and wherein the traffic limitation information indicates a traffic type used by the first station to communicate with the first access point in the at least one first time period over the at least one first data channel.

9. The method according to claim 6, wherein the first transmission allocation frame further comprises stay duration indication information, and the stay duration indication information indicates a stay duration when the first station fails to access the at least one first data channel.

10. The method according to claim 6, further comprising:
receiving, by the first access point over the common control channel, a third transmission allocation frame sent by a second access point, wherein the third transmission allocation frame indicates a second station will communicate with the second access point in a second time period for a second data channel; and
updating, by the first access point, a network allocation vector (NAV) table based on the third transmission allocation frame, to obtain an updated NAV table, wherein the updated NAV table comprises channel information indicating the second data channel and time information indicating the second time period.

11. An apparatus, comprising:
a transceiver, configured to receive, over a common control channel, a first transmission allocation frame sent by a first access point, wherein the first transmission allocation frame indicates to a station to communicate with the first access point in a first time period over a first data channel, the first transmission allocation frame comprises channel information and time information, the channel information indicates the first data channel, and the time information indicates the first time period; and
a processor, configured to communicate with the first access point in the first time period over the first data channel using the transceiver,
wherein a transmission requirement frame comprises at least one of aperiodic traffic indication information or periodic traffic indication information, the aperiodic traffic indication information comprises traffic type indication information and a size of to-be-transmitted data of at least one traffic type, the traffic type indication information indicates the at least one traffic type, wherein the periodic traffic information comprises communications stream indication information and attribute information of at least one communications stream, and the communications stream indication information is used to indicate the at least one communications stream; and wherein the transmission requirement frame is sent by the station over the common control channel.

12. The apparatus according to claim 11, wherein the first transmission allocation frame further comprises at least one of uplink or downlink indication information or traffic limitation information, the uplink or downlink indication information indicates a transmission type of communication performed in the first time period over the first data channel, and the transmission type is downlink transmission, single-user uplink transmission, or multi-user uplink transmission; and wherein the traffic limitation information indicates a traffic type of communication performed in the first time period over the first data channel.

13. The apparatus according to claim 11, wherein the processor is further configured to:
switch to the common control channel in response to failing to access the first data channel within a stay duration in the first time period or within the first time period.

14. The apparatus according to claim 13, wherein the first transmission allocation frame further comprises stay duration indication information, and the stay duration indication information indicates the stay duration.

15. The apparatus according to claim 11, wherein the common control channel comprises a plurality of slots, each slot comprises a first phase and a second phase, the station sends the transmission requirement frame in a first phase of a first slot, the station receives the first transmission allocation frame in a second phase of a second slot, the first time period of the first transmission allocation frame is a time period in a next slot of the second slot in which the second phase is located, and the first slot and the second slot are the same slot or different slots.

16. An apparatus, comprising:
a transceiver, configured to send, over a common control channel, a first transmission allocation frame to a first station, wherein the first transmission allocation frame indicates to the first station to communicate with the apparatus in at least one first time period over at least one first data channel, the first transmission allocation frame comprises at least one piece of channel information and at least one piece of time information, each piece of channel information indicates at least one first data channel, and each piece of time information indicates at least one first time period; and
a processor, configured to communicate with the first station in the at least one first time period over the at least one first data channel by using the transceiver; and
wherein the transceiver is further configured to send the first transmission allocation frame to the first station in a send window over the common control channel, and wherein:
a duration of the send window is less than a first preset duration T, and an end point of the send window is a start point of a farthest first time period in the at least one first time period; or
the duration of the send window is less than a second preset duration L, an end point of the send window is an end point of an allocated time period, and the allocated time period is a time period, for performing communication, indicated by a second transmission allocation frame sent by the apparatus before sending the first transmission allocation frame.

17. The apparatus according to claim 16, wherein the common control channel comprises a plurality of slots, each slot comprises a first phase and a second phase, the first station receives a transmission requirement frame sent by the first station, the first transmission allocation frame is sent to the first station in a second phase of a second slot, and the at least one first time period indicated by the first transmission allocation frame is comprised in a next slot of the second slot in which the second phase is located.

18. The apparatus according to claim 16, wherein the first transmission allocation frame further comprises at least one of uplink or downlink indication information or traffic limitation information, the uplink or downlink indication information indicates a transmission type of communication performed in the at least one first time period over the at least one first data channel, and the transmission type is downlink transmission, single-user uplink transmission, or multi-user uplink transmission; and wherein the traffic limitation information indicates a traffic type used by the first station to communicate with a first access point in the at least one first time period over the at least one first data channel.

* * * * *